United States Patent [19]
Akashi et al.

[11] Patent Number: 5,619,601
[45] Date of Patent: Apr. 8, 1997

[54] OPTICAL SWITCH AND OPTICAL DISTRIBUTOR USING POLARIZATION CONTROL AND PARTIAL REFLECTION

[75] Inventors: Tamotsu Akashi; Tsuyoshi Yamamoto, both of Kawasaki; Takakiyo Nakagami, Tokyo, all of Japan

[73] Assignee: Fujitsu Limited, Kanagawa, Japan

[21] Appl. No.: 328,061

[22] Filed: Oct. 24, 1994

[30] Foreign Application Priority Data

Dec. 28, 1993 [JP] Japan .................................. 5-335332

[51] Int. Cl.$^6$ .............................. G02B 6/27; G02B 6/35
[52] U.S. Cl. ............................ 385/16; 385/11; 385/18
[58] Field of Search .................. 385/11, 14–24, 385/39, 47, 48

[56] References Cited

U.S. PATENT DOCUMENTS

| | | | |
|---|---|---|---|
| 4,805,977 | 2/1989 | Tamura et al. | 385/11 X |
| 4,948,229 | 8/1990 | Soref | 385/16 |
| 4,989,941 | 2/1991 | Soref | 385/16 |
| 5,321,498 | 6/1994 | Song et al. | 385/14 |
| 5,381,250 | 1/1995 | Meadows | 385/11 X |

FOREIGN PATENT DOCUMENTS 3-204621 9/1991 Japan .

OTHER PUBLICATIONS

S.H. Song, E.H. Lee, C.D. Carey, D.R. Selviah and J.E. Midwinter, Sep. 15, 1992, pp. 1253–1255, "Planar Optical Implementation of crossover interconnects", 1992 Optical Society of America vol. 17, No. 18 *Optics Letters.*

*Primary Examiner*—John D. Lee

[57] ABSTRACT

A reflecting-type optical switch is constructed by stacking a parallel plate-shaped glass substrate and a parallel plate-shaped polarization controller, providing a reflecting portion in such a manner that incident light propagates in zigzag fashion owing to reflection, and depositing a polarizing separating film on the glass substrate where two prescribed incident light beams intersect owing to reflection. Further, a transmission-type optical switch is constructed by providing a polarization controller in front of a polarizing prism, and depositing a polarizing separating film on the glass substrate of the polarizing prism where two prescribed incident light beams intersect owing to reflection. Furthermore, an optical distributor is constructed by stacking a plurality of parallel plate-shaped glass substrates and depositing a partial reflecting film on the glass substrate where two prescribed incident light beams intersect owing to reflection.

21 Claims, 19 Drawing Sheets

P WAVE

P WAVE

FIG. 8A
FIG. 8B
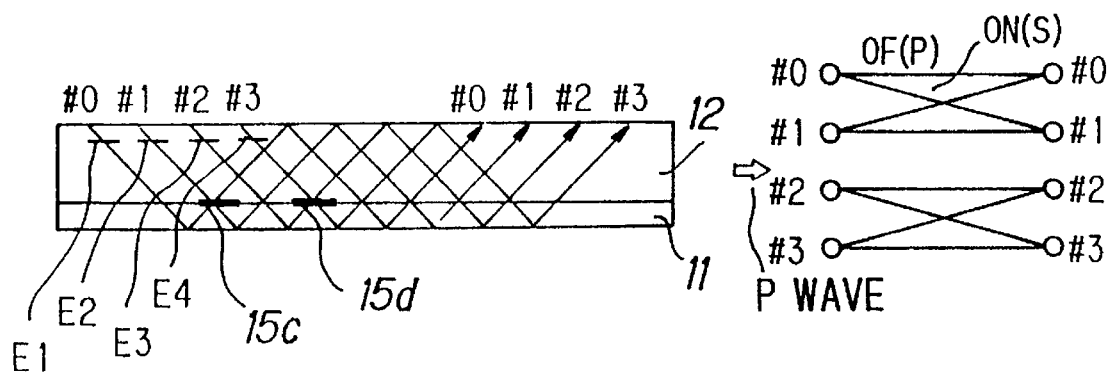
FIG. 9
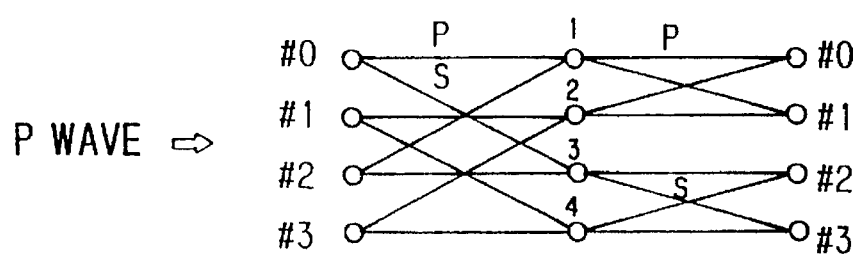

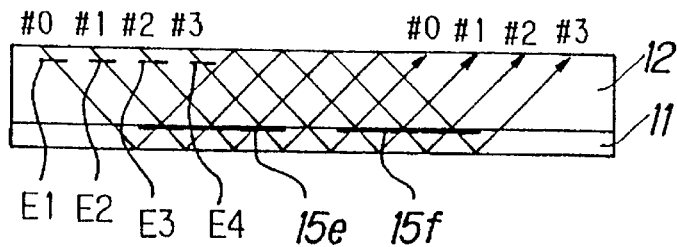
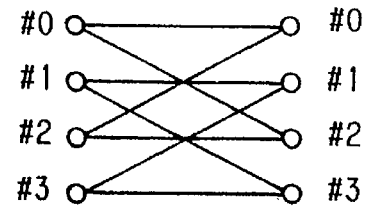
FIG. 13A  FIG. 13B
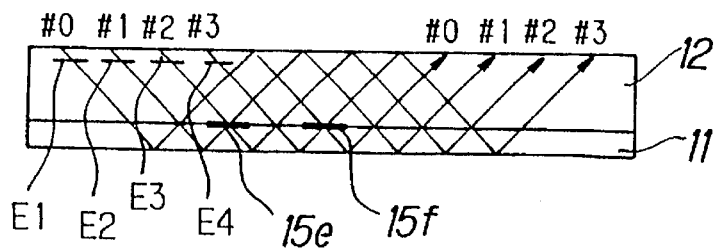
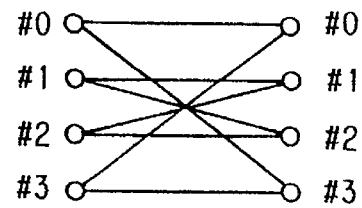
FIG. 14A  FIG. 14B
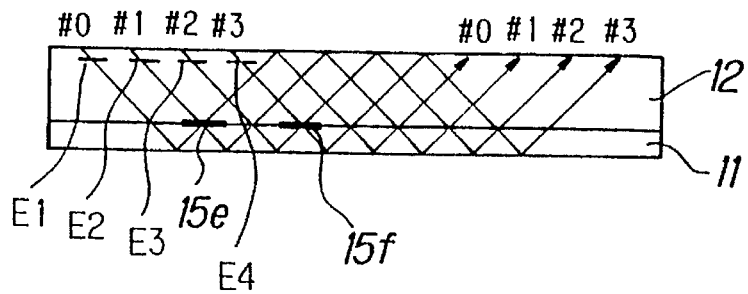
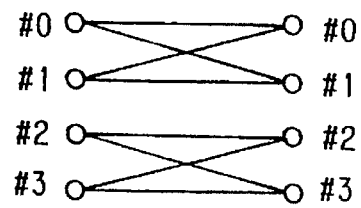
FIG. 15A  FIG. 15B

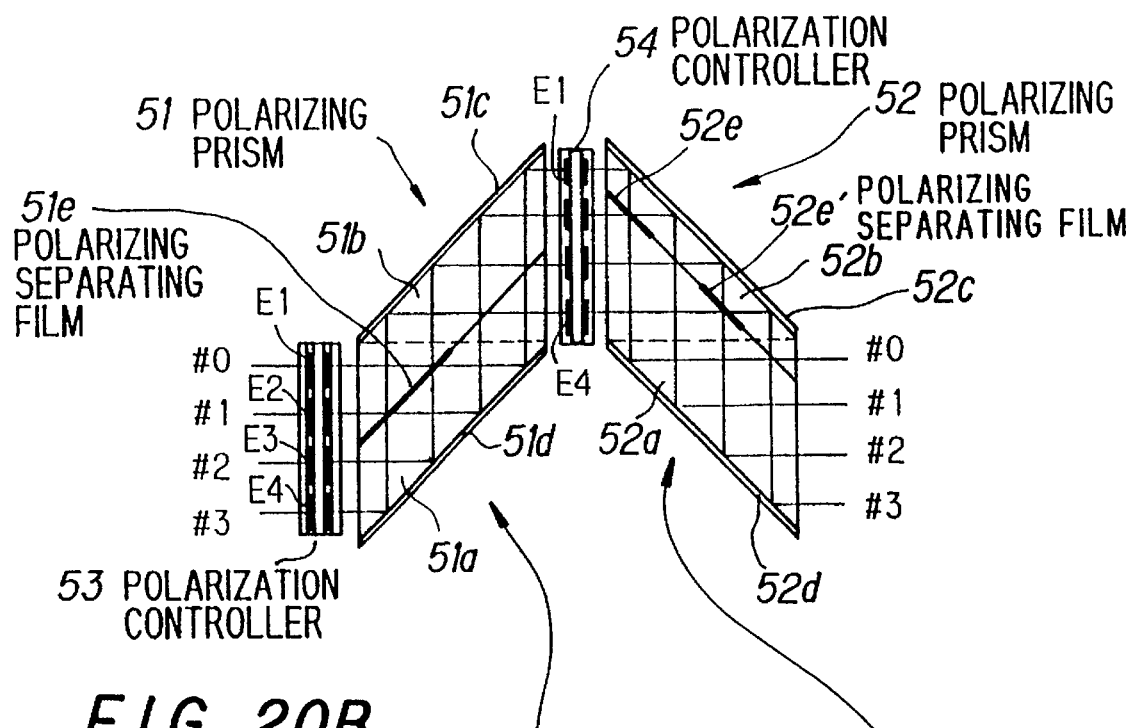
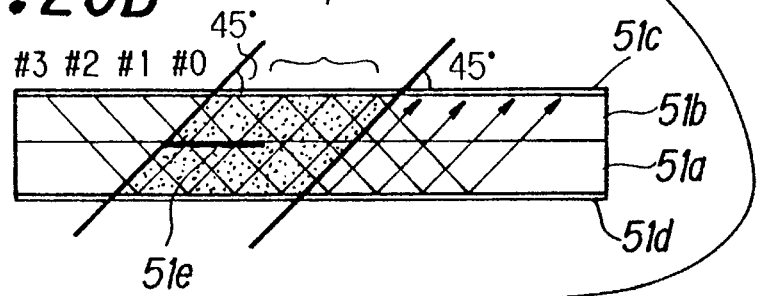
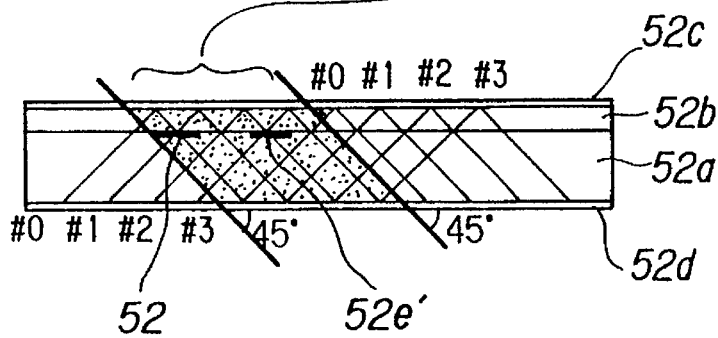

OPTICAL SWITCH AND OPTICAL DISTRIBUTOR USING POLARIZATION CONTROL AND PARTIAL REFLECTION

BACKGROUND OF THE INVENTION

This invention relates to an optical switch and an optical distributor. More particularly, the invention relates to an optical switch, which is placed between the transmitting and receiving sections of an optical signal, or in a transmission line, for switching optical signals, as well as to an optical distributor for distributing optical signals.

In the field of communications and information processing in recent years, an optical-signal network has to be required in order to increase the volume of information handled and raise system operating speed. In order to realize a highly sophisticated network, there is a need for an optical switch and optical distributor for connecting or switching a large number of signals.

To achieve this, research in optical switches has progressed and a variety of optical switches have been proposed. FIGS. 23A–23E are diagrams for describing reflection-type optical switches proposed by S. H. Song, et al (see S. H. Song, et. al., *Optics Letters*, Vol. 17, No. 18, 1992). One type of optical switch includes a glass substrate GPL composed of two layers, a polarizing separating film PBS coating the top surface of the glass. substrate GPL, a microprism MPZ formed by subjecting the surface of the glass substrate over the polarizing separating film PBS to micromachining, and a mirror MR formed on the other surface of the glass substrate (see FIGS. 23B and 23D). The reflection-type optical switch controls the state of polarization of incident light (e.g., transversely polarized light) at a polarization controller (not shown), inputs the incident light, whose state of polarization has been controlled, to the polarizing separating film PBS, transmits and reflects the incident light at the polarizing separating film PBS in dependence upon the state of polarization, and reflects the transmitted incident light twice at the inner side of the microprism MPZ, thereby changing the optical path.

For example, in FIG. 23B, transversely polarized light (a P wave) inputted at #1 is reflected by the mirror MR, after which the light passes through the polarizing separating film PBS and reaches the microprism MPZ, at which the light is reflected twice so as to be outputted from output optical path #1 (see FIG. 23D). In this case there is no change in the optical path. However, when the state of polarization of the incident light is controlled by the polarization controller (not shown) so that a change is made to longitudinal polarization (an S wave), the incident light is reflected by the polarizing separating film PBS and is outputted from optical path #4. Thus, the optical path is switched. Similarly, optical signals which have entered from #2–#4 also undergo a switch in optical path depending upon the state of polarization. Accordingly, a network illustrated on the left side of FIG. 23A is constructed by the optical switch of FIG. 23B.

FIG. 23C illustrates an optical switch for constructing another network. This type of optical switch has two small microprisms MPZ1, MPZ2 formed in the surface of the glass substrate GPL. Transversely polarized light (a P wave) inputted at #1 is reflected by the mirror MR, after which the light passes through the polarizing separating film PBS and reaches the microprism MPZ1, at which the light is reflected twice so as to be outputted from output optical path #1 (see FIG. 23E). In this case there is no change in the optical path. However, when the state of polarization of the incident light is controlled by the polarization controller so that a change is made to longitudinal polarization (an S wave), the incident light is reflected by the polarizing separating film PBS and is outputted from optical path #2. Thus, the optical path is switched. Similarly, optical signals which have entered from #2–#4 also undergo a switch in optical path depending upon the state of polarization. A network illustrated on the right side of FIG. 23A is constructed by the optical switch of FIG. 23C. Accordingly, when the switches shown in FIGS. 23B and 23C are optically coupled, the overall network depicted in FIG. 23A is constructed, and incident light which has entered from each of the input optical paths #1–#4 can be outputted from any one of the output optical paths #1–#4.

FIGS. 24A–E show a prior-art example of a transmission-type optical switch. This optical switch has been disclosed in the specification of Japanese Patent Application Laid-Open (KOKAI) No. 3-204621. FIG. 24A illustrates a four-input, four-output optical switch comprising liquid-crystal cells LC1–LC3, polarizing prisms P1, P1', P2, P2', GRIN lenses GR, optical fibers F and fiber collimator arrays CA each mounting a plurality of the GRIN lenses GR. An AC voltage is applied to each of the liquid-crystal cells LC1–LC3 via conductors. Turning the AC voltage on and off controls the polarization of the incident light so as to switch the optical path. As shown in FIGS. 24B and 24C, each of the liquid-crystal cells LC1–LC3 comprises transparent electrodes EL1–EL4 provided on each of its opposing sides, a rubbing film CF of polyimide or the like for aligning the liquid crystal, two glass substrates SU arranged to maintain a fixed spacing between them, and liquid crystal LI sealed in the gap between the glass substrates. The edges of the gap are sealed by a sealant AD such as epoxy resin in order to prevent outflow of the liquid crystal. The electrode patterns are arranged as shown in FIG. 24C in order that the respective optical paths may be switched independently of one another, and conductors WI1–WI4 for applying voltage to the electrodes are connected to the respective electrodes. Examples of the liquid crystal used are twisted nematic liquid crystal and ferroelectric liquid crystal. Twisted nematic liquid crystal does not experience rotation of polarization plane under application of a voltage but the plane of polarization does rotate by 90° when voltage is removed. Ferroelectric liquid crystal can be switched between a state in which the polarization plane is rotated and a state in which it is not by applying pulses of different polarity (+, −) thereto. The liquid-crystal cell shown in FIG. 24A employs twisted nematic liquid crystal.

As shown in FIGS. 24D, 24E, each of the polarizing prisms P1, P1', P2, P2' has the shape of a parallelepiped with an apex angle of 45°. A polarizing separating film PM and a total internal reflecting film M are arranged as shown. The polarizing separating film PM transmits horizontally polarized light (P waves) and reflects vertically polarized light (S waves). More specifically, S waves are reflected by the polarizing separating film PM, after which the P waves are reflected again at the end of the prism before exiting. The P waves pass through the polarizing separating film PM and then exit from the prism. The total internal reflecting film M reflects light without relation to the state of polarization, and light incident upon either surface of the film is reflected. The polarizing prisms P1, P1', P2, P2' and liquid-crystal cells LC1–LC3 are arranged alternatingly and combined in multiple stages, as shown in FIG. 24A, and the elements are secured by a bonding agent to construct the four-input, four-output optical switch.

FIGS. 25A, 25B are diagrams for describing the switching of the optical paths in the optical switch of FIG. 24. Here components identical with those shown in FIG. 24 are designated by like reference characters. First and third electrodes E1, E3 of liquid-crystal cell LC1 are turned off, second and third electrodes E2, E3 of liquid-crystal cell LC2 are turned on, and first and third electrodes E1, E3 of liquid-crystal cell LC3 are turned off (off electrodes are shown in black and on electrodes are indicated by hatching).

As shown in FIG. 25A, vertically polarized light (S waves) in the incident light from incoming line O1 is reflected by the polarizing separating film PM of the polarizing prism P1, after which the reflected light is reflected again at the end of the polarizing prism before passing through the liquid-crystal cell LC1. At this time the first electrode of the liquid-crystal cell LC1 is off and, hence, the incident light is subjected to control of its polarization and is changed to horizontally polarized light (P waves). The incident light composed of P waves passes through the polarizing separating film PM of the polarizing prism P2 and is reflected by the total internal reflecting film M before passing through the liquid-crystal cell LC2. Since the second electrode of the liquid-crystal cell LC2 is on, the incident light undergoes no change in polarization and reaches the total internal reflecting film M of the polarizing prism P2'. Here the light is reflected, passes through the polarizing separating film PM, is reflected again at the end of the polarizing prism P2' and then passes through the liquid-crystal cell LC3. Since the first electrode of the liquid-crystal cell LC3 is off, the incident light is changed to vertically polarized light (S waves). Incident light composed of S waves is reflected at the end of the polarizing prism P1', after which the light is reflected again by the polarizing separating film PM before exiting from outgoing line O1'.

Similarly, horizontally polarized light (P waves) in the incident light from incoming line O1 propagates through the switch and is outputted from outgoing line O1' in the manner shown in FIG. 25B. Accordingly, if the electrodes of each of the liquid-crystal cells are turned on and off in the manner set forth above, light incident from incoming line O1 is outputted from outgoing line O1' without any change in optical path. However, (1) if the first and third electrodes of liquid-crystal cell LC1 are turned off, the second and third electrodes of liquid-crystal cell LC2 are turned off and the first and third electrodes of liquid-crystal cell LC3 are turned on, the light incident from incoming line O1 is outputted from outgoing line O2'. (2) If the first and third electrodes of liquid-crystal cell LC1 are turned off, the second and third electrodes of liquid-crystal cell LC2 are turned on and the first and third electrodes of liquid-crystal cell LC3 are turned on, the light incident from incoming line O1 is outputted from outgoing line O3'. (3) If the first and third electrodes of liquid-crystal cell LC1 are turned off, the second and third electrodes of liquid-crystal cell LC2 are turned off and the second and fourth electrodes of liquid-crystal cell LC3 are turned off, the light incident from incoming line O1 is outputted from outgoing line O4'. In other words, light incident from incoming line O1 can be outputted on any outgoing line to change the optical path. Likewise, light incident from any other incoming line can be outputted on any outgoing line.

With the construction of the reflection-type optical switch of the prior art, it is required that the microprisms be fabricated so that their angles are extremely precise. In addition, it is required that light strike the positions of the microprisms accurately. As a consequence, it is difficult to fabricate the conventional reflection-type optical switch. Moreover, aligning the optic axes is laborious Further, with the transmission-type optical switch of the prior art, the switch is simply reduced in size when designed for multiple-channel application. When the number of channels increases, therefore, it is required that a very large number of polarizing prisms be pasted together. Fabrication is a laborious task and there is a decline in fabrication precision.

SUMMARY OF THE INVENTION

Accordingly, a first object of the present invention is to provide a reflection-type optical switch capable of multiple-channel operation (multiple input/output) without subjecting a substrate to micromachining for microprisms.

A second object of the present invention is to provide a compact reflection-type optical switch which is easy to fabricate and in which the optical axes are easy to align.

A third object of the present invention is to provide a compact transmission-type optical switch capable of multiple-channel operation by means of a small number of polarizing prisms.

A fourth object of the present invention is to provide a reflection-type optical switch in which the polarizing prisms are easy to form.

A fifth object of the present invention is to provide a simply constructed, easily fabricated optical distributor in which distributed light can be obtained from the same location without relation to the incident light.

In accordance with the present invention, the first and second objects are attained by providing a reflection-type optical switch comprising a plate-shaped optical transmission member, a plate-shaped polarization controller superimposed on the optical transmission member for controlling polarization of incident light, first and second reflecting means provided on the optical transmission member and polarization controller, respectively, in such a manner that the incident light advances in zigzag fashion owing to reflection, and a polarizing separating film provided at a position at which two prescribed incident light beams intersect owing to reflection, wherein polarization of each incident light beam is controlled by the polarization controller before the light beam arrives at the polarizing separating film, thereby controlling an optical path of each incident light beam.

In accordance with the present invention, the third and fourth objects are attained by providing a transmission-type optical switch comprising a polarizing prism having a stacked optical transmission member obtained by superimposing optical transmission members, first and second reflecting means provided on respective ones of both sides of the stacked optical transmission member in such a manner that incident light propagates owing to reflection, and a polarizing separating film provided at a position at which two prescribed incident light beams intersect owing to reflection, wherein the number of the polarizing separating films, the length of each polarizing separating film and position at which it is deposited are decided in dependence upon network configuration, and a polarization controller provided in front of the polarizing prism for controlling polarization of incident light, wherein polarization of each incident light beam is controlled by the polarization controller before the light beam arrives at the polarizing separating film, thereby controlling an optical path of each incident light beam.

In accordance with the present invention, the fifth object is attained by providing an optical distributor comprising a stacked optical transmission member obtained by superimposing a plurality of plate-shaped optical transmission members, first and second reflecting means provided on respective ones of both sides of the stacked optical transmission member in such a manner that incident light propagates owing to reflection, and a partial reflecting film provided at a position on the stacked surface of the optical transmission member at which two prescribed incident light beams intersect owing to reflection, wherein each incident light beam is introduced to the partial reflecting film to be distributed to a plurality of optical paths.

Other features and advantages of the present invention will be apparent from the following description taken in conjunction with the accompanying drawings.

BRIEF DESCRIPTION OF THE DRAWINGS

FIGS. 2A–2C are diagrams showing the basic construction of the reflection-type optical switch (for a case where incident light is horizontally or vertical polarized light), in which FIG. 2A is for a case in which optical paths are not interchanged, FIG. 2B is for a case in which optical paths are interchanged, and FIG. 2C is a modification of the reflection-type switch;

FIGS. 3A–3D are explanatory views for describing incidence-angle control means, in which FIG. 3A is a view for describing use of a rectangular prism, FIG. 3B a view for describing use of a V-shaped groove, FIG. 3C a view for describing use of a groove and a reflecting film, and FIG. 3D a view for describing use of a diffraction grating;

FIGS. 5A and 5B are diagrams showing the basic construction of the reflection-type optical switch (for a case where incident light has any polarization), in which FIG. 5A is for a case in which optical paths are not interchanged and FIG. 5B is for a case in which optical paths are interchanged;

FIG. 8A is a diagram showing the construction of a four-input, four-output third optical switch, and FIG. 8B is a diagram showing the construction of the switch network;

FIG. 9 is a diagram showing the construction of a banyan network;

FIG. 13A is a diagram showing the construction of a first four-input, four-output second optical switch in a case where glass-substrate thickness is identical, and FIG. 13B is a diagram showing the construction of the switch network;

FIG. 14A is a diagram showing the construction of a second four-input, four-output second optical switch in a case where glass-substrate thickness is identical, and FIG. 14B is a diagram showing the construction of the switch network;

FIG. 15A is a diagram showing the construction of a second four-input, four-output third optical switch in a case where glass-substrate thickness is identical, and FIG. 15B is a diagram showing the construction of the switch network;

FIG. 20A is a diagram showing the construction of a transmission-type optical switch according to the present invention, and FIGS. 20B, 20C are diagram showing the construction of a polarizing prism;

FIGS. 23A–23E are diagrams showing the construction of a reflection-type optical switch according to the prior art, in which FIG. 23A is a diagram illustrating the construction of a network, FIGS. 23B, 23C diagrams showing the construction of an optical switch having a microprism and FIGS. 23D, 23E enlarged views of microprisms;

FIGS. 24A–24E are diagrams showing the construction of a transmission-type optical switch according to the prior art, in which FIG. 24A is a diagram illustrating the overall construction, FIG. 24B a sectional view of a liquid-crystal cell, FIG. 24C the electrode patterns of the liquid-crystal cell, and FIGS. 24D and 24E explanatory views of a polarizing prism.

DESCRIPTION OF THE PREFERRED EMBODIMENTS

(a) Overview of the Invention

Figure 1A:
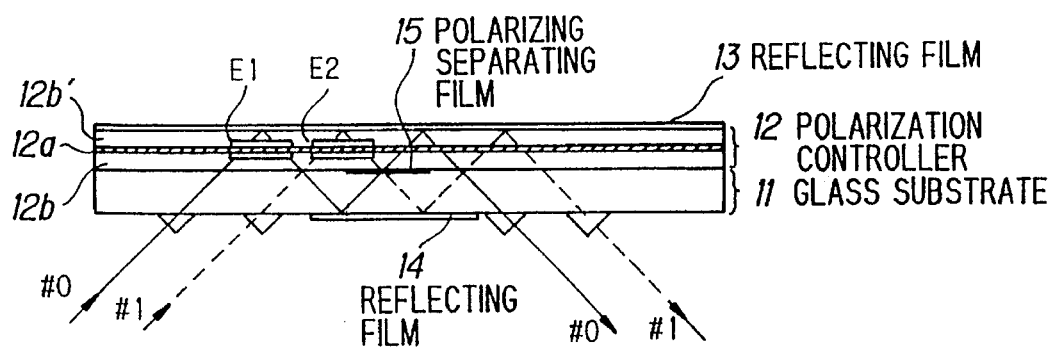
FIG. 1A is a general explanatory view for describing the general features of a reflection-type optical switch according to the present invention.
Figure 1B:
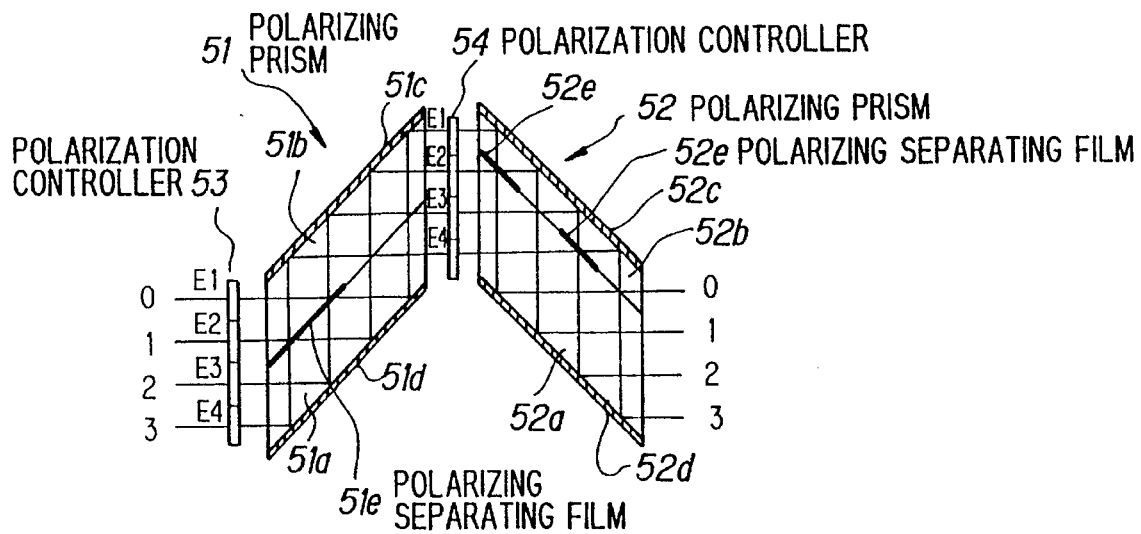
FIG. 1B is a general explanatory view for describing the general features of a transmission-type optical switch according to the present invention.
Figure 1C:
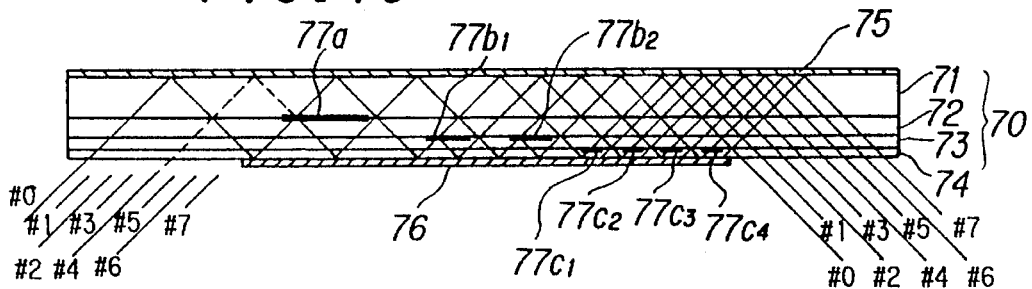
FIG. 1C is a general explanatory view for describing the general features of an optical distributor according to the present invention.

FIG. 1A is a general explanatory view for describing the general features of a reflection-type optical switch according to the present invention, FIG. 1B is a general explanatory view for describing the general features of a transmission-type optical switch according to the present invention, and FIG. 1C is a general explanatory view for describing the general features of an optical distributor.

(a-1) Reflection-Type Optical Switch

As shown in FIG. 1A, a reflection-type optical switch includes a parallel plate-shaped glass substrate 11, a parallel plate-shaped polarization controller 12 superimposed on the glass substrate 11 for switching the state of polarization of incident light by external control, first and second reflecting films 13, 14 provided on the polarization controller 12 and glass substrate 11, respectively, in such a manner that incident light propagates in zigzag fashion owing to reflection (the reflecting film 14 can be eliminated by arranging it so that total internal reflection is produced by the difference between the refractive indices of the optical transmission member and air), and a polarizing separating film 15 vapor-deposited on the glass substrate 11 where two prescribed incident light beams intersect owing to reflection, thereby passing horizontally polarized light and reflecting vertically polarized light. The polarization controller 12 includes ferroelectric liquid crystal 12a and thin glass substrates 12b, 12b provided on both sides of the liquid crystal 12a. The thin glass substrates 12b, 12b' are each formed to have electrode patterns E1, E2 on the optical path of the incident light.

Assume that the incident light is horizontally polarized light (P waves). With the electrodes E1, E2 in the off state, light incident from an incoming line #0 is reflected by each of the reflecting films 13, 14 and then arrives at the polarizing separating film 15. Since the electrode E1 is off and the state of polarization of the incident light is unchanged, the incident light passes through the polarizing separating film 15 and is then reflected by the reflecting film 13, after which the light is outputted from outgoing line #0. Thus, the optical path is not switched. Light incident from incoming line #1 is reflected by the reflecting film 13 and then reaches the polarizing separating film 15. Since the electrode E2 is off and the state of polarization of the incident light is unchanged, the incident light passes through the polarizing separating film 15 and is then reflected by the reflecting films 14, 13, after which the light is outputted from outgoing line #1. Thus, the optical path is not switched.

With the electrodes E1, E2 in the on state, light incident from the incoming line #0 has its polarization changed by the polarization controller 12 and becomes vertically polarized light (S waves). The incident light is reflected by each of the reflecting films 13, 14 and then arrives at the polarizing separating film 15. Since the incident light is an S wave, the light is reflected by the polarizing separating film 15 and then by the reflecting films 14, 13, after which it is outputted from the outgoing line #1. Thus, the optical path is switched. Further, light incident from an incoming line #1 has its polarization changed by the polarization controller 12 and becomes vertically polarized light (S waves). The incident light is reflected by the reflecting film 13 and then arrives at the polarizing separating film 15. Since the incident light is an S wave, the light is reflected by the polarizing separating film 15 and then by the reflecting film 13, after which it is outputted from the outgoing line #0. Thus, the optical path is switched.

Accordingly, polarization of each incident light beam is controlled by the polarization controller 12 before the light beam arrives at the polarizing separating film 15, whereby the optical path of each incident light beam can be switched. Thus, optical paths can be switched without providing a microprism. This makes it easy to fabricate the optical switch.

Further, if an arrangement is adopted in which a second polarizing separating film for separating incident light into vertically polarized light and horizontally polarized light is provided at the light input portion of the device, incident light is separated into P and S waves by the second polarizing separating film, the states of polarization of the P and S waves are each controlled by the polarization controller 12 and the optical path of each component whose polarization has been controlled is switched by the polarizing separating film 15, then optical paths can be switched regardless of the state of polarization of the entrant light. Moreover, the lengths of the optical paths of the P and S waves can be made identical.

Furthermore, by appropriately determining the number of polarizing separating films, the length of each polarizing separating film and deposited position (pattern), an optical switch for any network configuration can be fabricated. Moreover, by integrally forming a plurality of switches conforming to various network configurations in such a manner that the optical switches are optically coupled, an optical switch of a banyan network or cross-over network can be simply constructed.

(a-2) Transmission-Type Optical Switch

As shown in FIG. 1B, a transmission-type optical switch includes polarizing prisms 51, 52 and polarization controllers 53, 54 provided in front of the polarizing prisms 51, 52, respectively, for controlling the state of polarization of incident light. The polarizing prisms 51, 52 include stacked glass substrates 51a, 51b; 52a, 52b, respectively, first and second reflecting films 51c, 51d; 52c, 52d provided on each of the glass substrates in such a manner that incident light propagates in zigzag fashion owing to reflection (the reflecting films can be eliminated by arranging it so that total internal reflection is produced by the difference between the refractive indices of the optical transmission member and air), and polarizing separating films 51e, 52e vapor-deposited on the glass substrates where two prescribed incident light beams intersect owing to reflection, thereby passing horizontally polarized light and reflecting vertically polarized light. The polarization controllers 53, 54 use ferroelectric liquid crystal as the liquid-crystal material.

Assume that the incident light is horizontally polarized light (P waves). (1) With the first electrodes E1, E1 of the polarization controllers 53, 54 both in the off state, light incident from the incoming line #0 passes through each of the polarizing separating films 51e, 52e and is reflected by each of the reflecting films so as to be outputted from the outgoing line #0. (2) With the first electrode E1 of the polarization controller 53 in the off state and the first electrode E1 of the polarization controller 54 in the on state, light incident from the incoming line #0 is outputted from the outgoing line #1. (3) With the first electrode E1 of the polarization controller 53 in the on state and the third electrode E3 of the polarization controller 54 in the on state, light incident from the incoming line #0 is outputted from an outgoing line #2. (4) With the first electrode E1 of the polarization controller 53 in the on state and the third electrode E3 of the polarization controller 54 in the off state, light incident from the incoming line #0 is outputted from an outgoing line #3. Thus, by controlling the polarization of incident light by the polarization controllers 53, 54, light can be outputted on any outgoing line and the optical path can be switched. Light from the other incoming lines #1~#3 also can be outputted on any outgoing line in similar fashion.

Thus, a two-input, four-output optical switch can be constructed by two polarizing prisms. The number of polarizing prisms can be reduced by two in comparison with the prior-art transmission-type optical switch, and a more compact arrangement is possible even in a multiple-channel application.

Further, the polarizing prisms are fabricated upon deciding the number of the polarizing separating films, the length of each polarizing separating film and position at which it is deposited in dependence upon the network configuration, and polarization of each incident light beam is controlled by the polarization controller before the light beam arrives at the polarizing separating film, thereby making it possible to switch the optical path of each incident light beam. Moreover, by optically cascade-connecting a plurality of optical switches conforming to each type of network configuration, an optical switch of a banyan network or cross-over network can be simply constructed.

Furthermore, a polarizing prism can be fabricated in a simple manner by fabricating an optical member comprising stacked parallel plate-shaped glass substrates, first and second reflecting means provided on each glass substrate in such a manner that incident light propagates in zigzag fashion owing to reflection, and polarizing separating films deposited on the glass substrates where two prescribed incident light beams intersect owing to reflection, and then cutting this optical member to a desired shape.

(a-3) Optical Distributor

As shown in FIG. 1C, an optical distributor according to the invention includes a stacked optical transmission member 70 obtained by stacking a plurality of parallel plate-shaped glass substrates 71~74. The thickness of the uppermost glass substrate 71 is one-half the total thickness; the thickness of the glass substrate 72 second from the top is $½^2$ the total thickness; and the thickness of the glass substrate 73 third from the top and of the lowermost glass substrate 74 is $½^3$ the total thickness. Numerals 75, 76 denotes first and second reflecting films provided on both sides of the stacked optical transmission member 70 in such a manner that incident light propagates in zigzag fashion owing to reflection (the reflecting films can be eliminated by arranging it so that total internal reflection is produced by the difference between the refractive indices of the optical transmission member and air). Numerals 77a, $77b_1$~$77b_2$, $77c_1$~$77c_4$ represent partial reflecting films provided on the glass substrates where two prescribed incident light beams intersect owing to reflection. More specifically, (1) the partial reflecting film 77a is provided on the glass substrate 72, which is the second layer, where incident light beams from the incoming lines #0 and #4, #1 and #5, #2 and #6 and #3 and #7 intersect. (2) The partial reflecting film $77b_1$ is provided on the glass substrate 73, which is the third layer, where incident light beams from the incoming lines #0 and #2 intersect as well as the light beams from incoming lines #1 and #3. (3) The partial reflecting film $77b_2$ is provided on the glass substrate 73, which is the third layer, where incident light beams from the incoming lines #4 and #6 intersect as well as the light beams from incoming lines #5 and #7. (4) The partial reflecting films $77c_1$~$77c_4$ are provided on the glass substrate 74, which is the lowermost layer, where incident light beams from the incoming lines #0 and #1, #2 and #3, #4 and #5 and #6 and #7, respectively, intersect.

Incident light from a prescribed incoming line is caused to branch into two beams by the first partial reflecting film 77a, the incident light beams resulting from branching are each caused to branch into two beams by respective ones of the second partial reflecting films $77b_1$, $77b_2$, for a total of $2^2$ light beams resulting from branching, and each of these lights beams resulting from branching is caused to branch into two beams by respective ones of the third partial reflecting films $77c_1$~$77c_4$, for a total of $2^3$ light beams. Similarly, by increasing the number of layers, the number of light beams distributed can be increased. Thus, an optical distributor can be constructed in simple fashion by depositing a prescribed number of partial reflecting films at prescribed positions on the surfaces of stacked glass substrates. Moreover, light which has entered from each incoming line can be distributed to the same position.

(b) Basic Construction of Reflection-Type Switch (for case in which incident light is horizontally or vertically polarized light)

(b-1) Construction

Figure 2A:
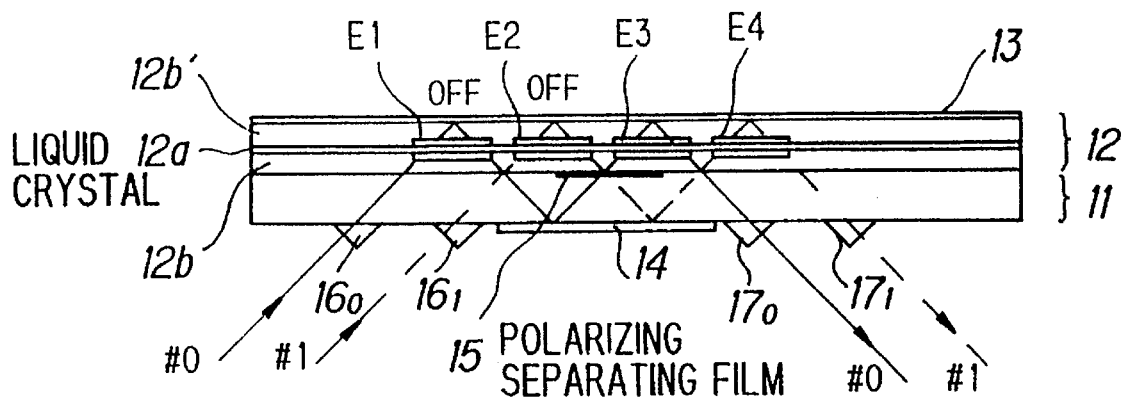
Figure 2B:
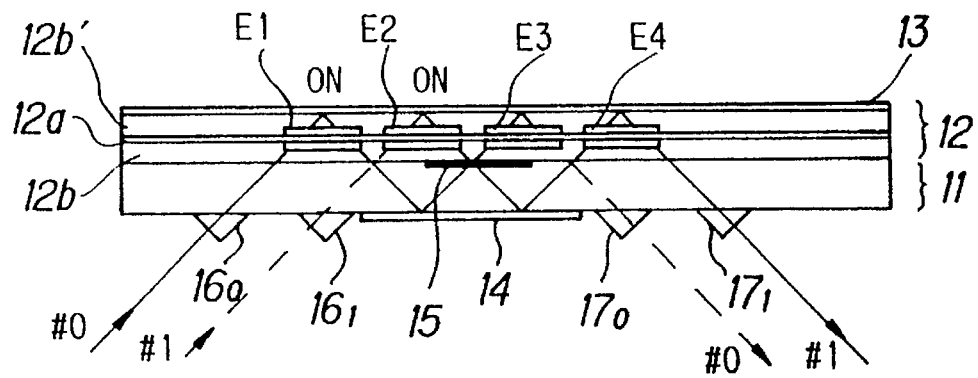
Figure 2C:
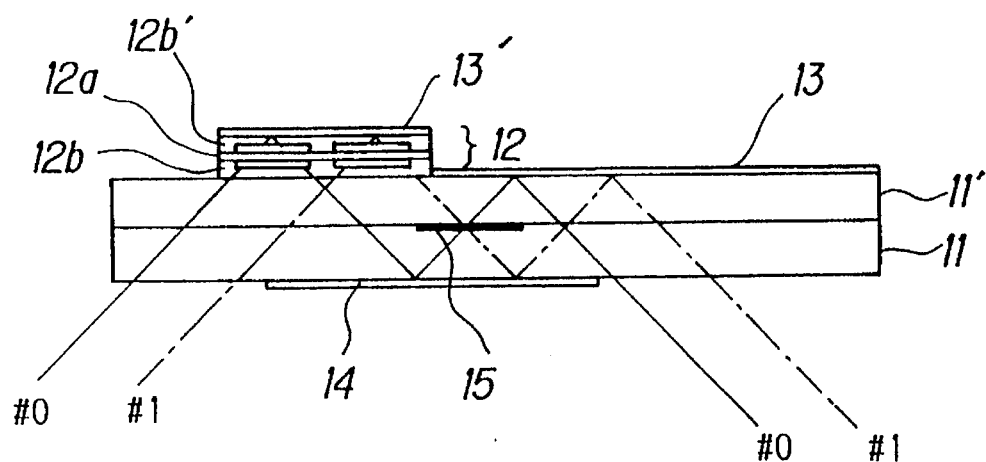

FIGS. 2A~2C are diagrams showing the basic construction of a reflection-type optical switch for a case in which incident light is horizontally or vertically polarized light.

The reflection-type optical switch includes the parallel plate-shaped glass substrate 11, the parallel plate-shaped polarization controller 12 superimposed on the glass substrate 11 for switching the state of polarization of incident light by external control, and the first and second reflecting films 13, 14 provided on the polarization controller 12 and glass substrate 11, respectively, in such a manner that incident light propagates in zigzag fashion owing to reflection. It should be noted that the reflecting film 14 can be eliminated by arranging it so that total internal reflection is produced by the difference between the refractive indices of the optical transmission member and air. The optical switch further includes the polarizing separating film 15 vapor-deposited on the glass substrate 11 where two prescribed incident light beams intersect owing to reflection, thereby passing horizontally polarized light (P waves) and reflecting vertically polarized light (S waves). The polarization controller 12 includes the ferroelectric liquid crystal 12a and the thin glass substrates 12b, 12b' provided on both sides of the liquid crystal 12a. The thin glass substrates 12b, 12b' are each formed to have electrode patterns E1~E4 on the optical path of the incident light. Numerals $16_0$, $16_1$ denote prisms provided on the light input portion of the glass substrate 11. The prisms $1_{60}$, $1_{61}$ serve to introduce incident light, which enters at an angle of incidence of 45°, into the glass substrate without bending the entrant light. Numerals $17_0$, $17_1$ denote prisms provided on the light output portion of the glass substrate 11. The prisms $17_0$, $17_1$ serve to output incident light, which enters at an angle of incidence of 45°, from the glass substrate without bending the entrant light.

(b-2) Operation

The optical switch of FIG. 2 constructs a two-input, two-output reflection-type optical switch. Assume that each incident light beam is horizontally polarized light (P waves). With the first and second electrodes E1, E2 in the off state (see FIG. 2A), light incident from the incoming light #0 is reflected by each of the reflecting films 13, 14 and then arrives at the polarizing separating film 15. Since the electrode E1 is off and the state of polarization of the incident light is unchanged, the incident light passes through the polarizing separating film 15 and is then reflected by the reflecting film 13, after which the light is outputted from outgoing line #0. Thus, the optical path is not switched. Light incident from incoming line #1 is reflected by the reflecting film 13 and then reaches the polarizing separating film 15. Since the electrode E2 is off and the state of polarization of the incident light is unchanged, the incident light passes through the polarizing separating film 15 and is then reflected by the reflecting films 14, 13, after which the light is outputted from outgoing line #1. Thus, the optical path is switched. In other words, if the first and second electrodes E1, E2 are turned off, the optical paths are not interchanged.

With the first and second electrodes E1, E2 in the on state, on the other hand (see FIG. 2B), light incident from the incoming line #0 has its polarization changed by the polarization controller 12 and becomes vertically polarized light (S waves). The incident light is reflected by each of the reflecting films 13, 14 and then arrives at the polarizing separating film 15. Since the incident light is an S wave, the light is reflected by the polarizing separating film 15 and then by the reflecting films 14, 13, after which it is outputted from the outgoing line #1. Thus, the optical path is switched. Further, light incident from the incoming line #1 has its polarization changed by the polarization controller 12 and becomes vertically polarized light (S waves). The incident light is reflected by the reflecting film 13 and then arrives at the polarizing separating film 15. Since the incident light is an S wave, the light is reflected by the polarizing separating film 15 and then by the reflecting film 13, after which it is outputted from the outgoing line #0. Thus, the optical path is switched. In other words, if the first and second electrodes E1, E2 are turned on, the optical paths are interchanged.

Though it is assumed above that the incident light is horizontally polarized light (P waves), the incident light may be vertically polarized light (S waves). When such is the case, however, the outgoing lines #0, #1 are reversed to #1, #0.

In the case of a two-input, two-output optical switch, the third and fourth electrodes E3, E4 play no part in interchanging optical paths and therefore these electrodes are not needed. FIG. 2C is an embodiment in which the third and fourth electrodes have been eliminated. When light passes through the polarization controller 12, some loss is produced. For this reason the arrangement in the embodiment of FIG. 2C is such that the light is passed through the polarization controller 12 only at the portion that controls the state of polarization and is not passed through the polarization controller at other portions. Numeral 11' denotes a glass substrate and 13' a reflecting film. The prisms $16_0$, $16_1$, $17_0$, $17_1$ are deleted.

(b-3) Control of Angle of Incidence

Light propagates through the interior of the optical switch at an angle of 45°. By adopting the angle of 45°, the length of the optical switch can be reduced. Moreover, light can be made to propagate through the interior of the optical switch in zigzag fashion by total internal reflection even if the reflecting films 13, 14 are not always provided.

Figure 3A:
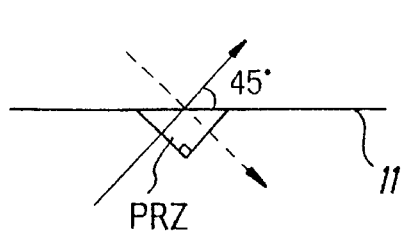
Figure 3B:
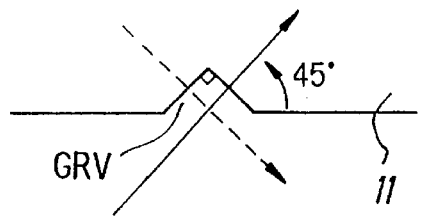

FIGS. 3A through 3d are diagrams for describing incidence-angle control means so adapted that light advances inside the optical switch at the angle of 45°. FIG. 3A depicts a rectangular prism PRZ attached to the glass substrate 11. Light is incident upon the prism at right angles. This arrangement makes it possible for light to be introduced into the optical switch without being bent. FIG. 3B illustrates the glass substrate 11 formed to have a V-shaped groove GRV defining a right angle. Here light impinges upon the surface of the groove GRV at right angles. This arrangement also makes it possible for light to be introduced into the optical switch without being bent.

Figure 3C:
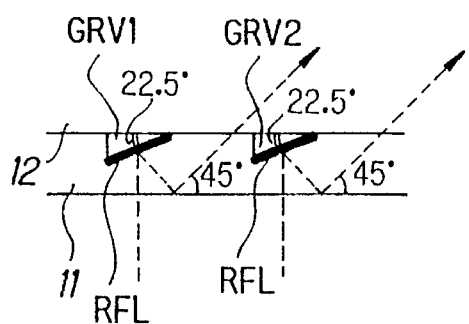
Figure 3D:
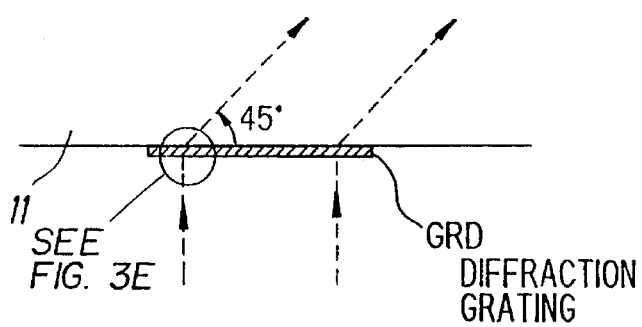
Figure 3E:
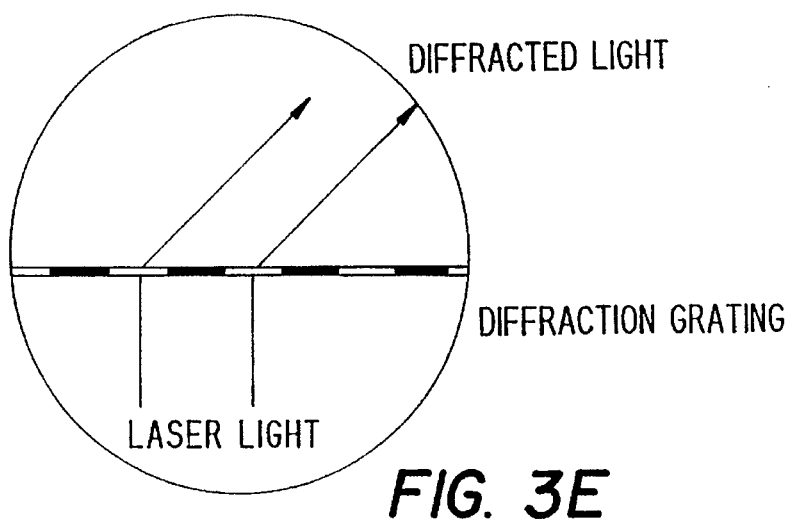

FIGS. 3C and 3D show arrangements in which light incident upon an optical switch at right angles propagates through the interior of the switch at an angle of 45°. In FIG. 3C, grooves GRV1, GRV2 each having half the angle (45°) at which light propagates through the switch are formed in the glass substrate 11, and the surface of each groove is coated with a reflecting film RFL. The arrangement is such that light incident at right angles is reflected by the reflecting film RFL and propagates through the optical switch at an angle of 45°. In FIG. 3D, a diffraction grating GRD is provided at the light-input portion of the glass substrate 11. Light incident at right angles is diffracted at an angle of 45° by the diffraction grating GRD and propagates through the interior of the optical switch at an angle of 45°. The diffraction grading GRD has a planar surface formed to have light and dark stripes or regularly assembled grooves at a very small pitch and utilizes a light-wave diffraction phenomenon to bend the optical path.

Though control of angle of incidence has been described above, control of exit angle is performed in a similar manner. For example, in order to arrange it so that light exits from the interior of the optical switch at 45°, a rectangular prism or rectangular groove is provided at the light-output portion of the switch, as shown in FIGS. 3A, 3B. Further, in a case where light exits from the optical switch at right angles, the diffraction grating GRD is provided, as shown in FIG. 3D. In a case where optical switches are cascade-connected in a number of stages to construct a desired network, matching between optical switches suffers when angle of incidence and angle of exit are 45°, as shown in FIGS. 3A, 3B. However, matching can be improved when the angle of incidence and exit angle are made right angles, as depicted in FIGS. 3C and 3C.

(b-4) Control of Light Convergence

Figure 4:
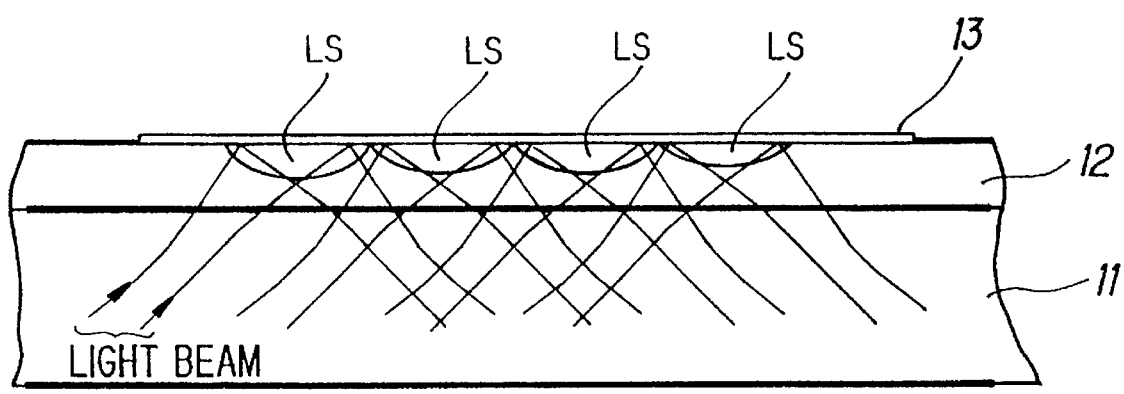
FIG. 4 is a view for describing control of light convergence.

An incident light beam diverges as it propagates through glass. A problem which arises is that side-by-side light beams overlap each other. According to this invention, therefore, as shown in FIG. 4, a plane lenses LS are placed in the optical paths of the light beams, and the light beams are converged to narrow them down so that adjacent light beams will not overlap each other. Numeral 11 denotes the glass substrate, 12 the polarization controller and 13 the reflecting film.

If light is converged in this manner, the light is capable of propagating over long distances without overlap. This makes multiple-channel applications possible.

(c) Basic Construction of Reflection-Type Optical Switch (for case in which incident light has any polarization)

(c-1) Construction

Figure 5A:
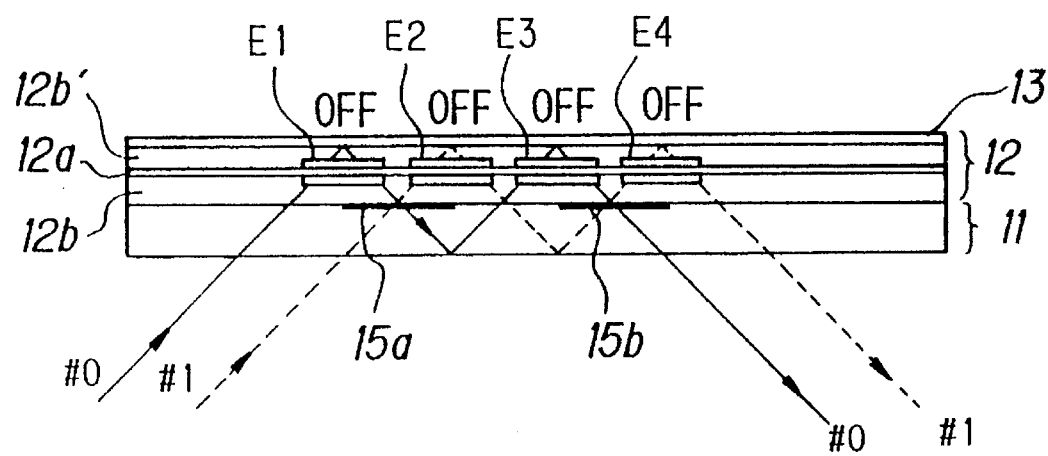
Figure 5B:
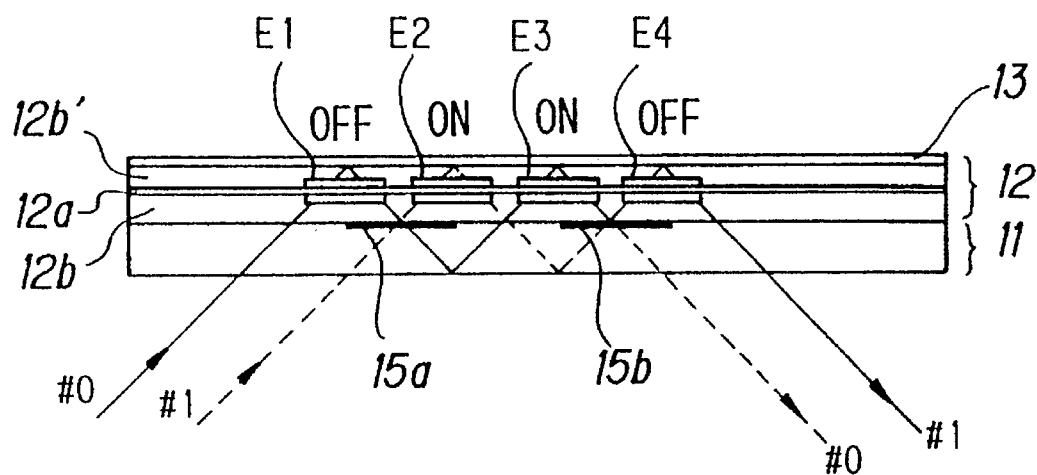

FIGS. 5A and 5b are diagrams for describing the basic construction of a reflection-type optical switch for a case in which incident light has any polarization. Here components identical with those shown in FIGS. 2A–2C are designated by like reference characters.

The reflection-type optical switch includes the parallel plate-shaped glass substrate 11, the parallel plate-shaped polarization controller 12 superimposed on the glass substrate 11 for controlling the state of polarization of incident light, the reflecting film 13 and polarizing separating films 15a, 15b vapor-deposited on the glass substrate 11 where two prescribed incident light beams intersect owing to reflection, thereby passing horizontally polarized light (P waves) and reflecting vertically polarized light (S waves). The polarization controller 12 includes the ferroelectric liquid crystal 12a and the thin glass substrates 12b, 12b' provided on both sides of the liquid crystal 12a. The thin glass substrates 12b, 12b' are each formed to have electrode patterns E1~E4 on the optical path of the incident light.

Means (prisms, rectangular grooves, diffraction gratings, etc.) for controlling angle of incidence and exit angle are deleted from the drawing. Further, in the example illustrated, reflection on the side of the glass substrate utilizes total internal reflection produced by the difference in the refractive indices of glass and air, and therefore the relevant reflecting film is not provided.

(c-2) Operation

The optical switch of FIG. 5 constructs a two-input, two-output reflection-type optical switch. Assume that each incident light beam has an arbitrary polarization. With all of the first through fourth electrodes E1~E4 in the off state (see FIG. 5A), horizontally polarized light (P waves) incident from the incoming line #0 is outputted from the outgoing line #0 upon passing through the polarizing separating films 15a, 15b. Vertically polarized light (S waves) incident from the incoming line #0 is outputted from the outgoing line #0 upon being reflected by the polarizing separating films 15a, 15b. Similarly, P and S waves of light incident from incoming lines #1 are outputted on outgoing line #1. Thus, optical paths are not switched.

With the second and third electrodes E2, E3 in the on state (see FIG. 5B), horizontally polarized light (P waves) incident from the incoming line #0 passes through the polarizing separating film 15a and then is changed to S waves by the polarization controller 12 (because the third electrode E3 is on). As a result, the S waves are reflected by the second polarizing separating film 15b so as to be outputted from the outgoing line #1 That is, the P waves of the light entrant from the incoming line #0 exit from the outgoing line #1. Further, vertically polarized light (S waves) incident from the incoming line #0 is reflected by the polarizing separating film 15a and the reflected light is then changed to P waves by the polarization controller 12 (because the second electrode is on). As a result, the P waves pass through the second polarizing separating film 15b so as to exit from the outgoing line #1. Thus, all of the light which has entered from the incoming line #1 is outputted from the outgoing line #1. Similarly, light which has entered from the incoming line #1 is outputted on outgoing line #0. Thus, the optical path is switched.

(d) Four-Input, Four-Output Optical Switch (for case in which incident light is horizontally polarized or vertically polarized light)

Figure 6A:
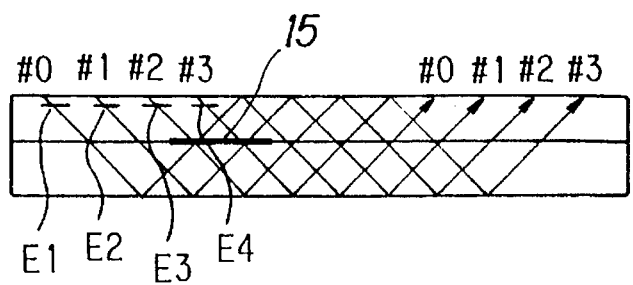
FIG. 6A is a diagram showing the construction of a four-input, four-output first optical switch.
Figure 6B:
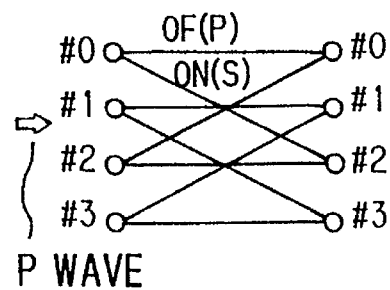
FIG. 6B is a diagram showing the construction of the switch network.

FIGS. 6A and 6B are diagrams for describing a first embodiment of a four-input, four-output optical switch for a case in which incident light is horizontally or vertically polarized light. Numeral 11 denotes the glass substrate and 12 the polarization controller for changing the state of polarization of each incident light beam. The polarization controller 12 is provided with electrodes E1~E4 conforming to respective ones of the incident light beams. The polarization controller 12 is illustrated in simplified form but has the same construction as the polarization controller shown in FIG. 2. Numeral 15 denotes the polarizing separating film deposited on the glass substrate at a prescribed position at which two incident light beams intersect. The polarizing separating film 15 is deposited on the glass substrate 11 where incident light beams from the incoming line #0 and incoming line #2 intersect and light beams from the incoming line #1 and incoming line #3 intersect. Though reflecting means is provided on both sides of the optical switch, this is not illustrated.

Assume that the light incident on the four-input, four-output optical switch of FIG. 6 is horizontally polarized light (P waves). If the first through fourth electrodes E1~E4 are off, incident light which has entered from each of the incoming lines #0~#3 is outputted on the outgoing lines #0~#3, respectively, and, hence, the optical paths are not switched. However, if the first through fourth electrodes E1~E4 are on, incident light which has entered from each of the incoming lines #0, #1, #2, #3 is outputted on the outgoing lines #2, #3, #0, #1, respectively. In other words, a network illustrated in FIG. 6B is constructed by the optical switch of FIG. 6A.

Figure 7A:
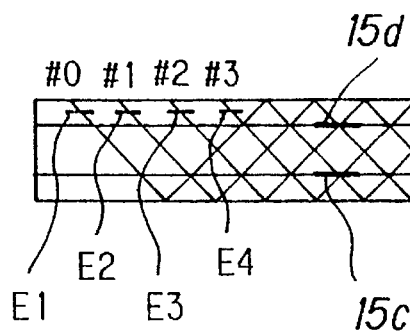
FIG. 7A is a diagram showing the construction of a four-input, four-output second optical switch.
Figure 7B:
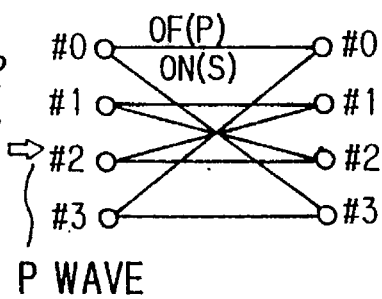
FIG. 7B is a diagram showing the construction of the switch network.

FIGS. 7A and 7B are diagrams for describing a second embodiment of a four-input, four-output optical switch for a case in which incident light is horizontally or vertically polarized light. Numerals 11, 11' designate first and second glass substrates constructing a stacked glass substrate. Numeral 12 denotes the polarization controller for changing the state of polarization of each incident light beam. The polarization controller 12 is provided with electrodes E1~E4 conforming to respective ones of the incident light beams. The polarization controller 12 is illustrated in simplified form but has the same construction as the polarization controller shown in FIG. 2. Numerals 15c, 15d represent polarizing separating films deposited on the glass substrates at prescribed positions at which two incident light beams intersect. The polarizing separating film 15c is deposited on the glass substrate 11 where incident light beams from the incoming line #0 and incoming line #3 intersect, and the polarizing separating film 15d is deposited on the glass substrate 11' where incident light beams from the incoming line #1 and incoming line #2 intersect. Though reflecting means is provided on both sides of the optical switch, this is not illustrated.

Assume that the light incident on the four-input, four-output optical switch of FIG. 7 is horizontally polarized light (P waves). If the first through fourth electrodes E1~E4 are off, incident light which has entered from each of the incoming lines #0~#3 is outputted on the outgoing lines #0~#3, respectively, and, hence, the optical paths are not switched. However, if the first through fourth electrodes E1~E4 are on, incident light which has entered from each of the incoming lines #0, #1, #2, #3 is outputted on the outgoing lines #3, #2, #1, #0, respectively. In other words, a network illustrated in FIG. 7B is constructed by the optical switch of FIG. 7A.

FIGS. 8A and 8B are diagrams for describing a third embodiment of a four-input, four-output optical switch for a case in which incident light is horizontally or vertically polarized light. Numeral 11 denotes the glass substrate and 12 the polarization controller for changing the state of polarization of each incident light beam. The polarization controller 12 is provided with electrodes E1~E4 conforming to respective ones of the incident light beams. The polarization controller 12 is illustrated in simplified form but has the same construction as the polarization controller shown in FIG. 2. Numerals 15c, 15d represent polarizing separating films deposited on the glass substrate at prescribed positions at which two incident light beams intersect. The polarizing separating film 15c is deposited on the glass substrate 11 where incident light beams from the incoming line #0 and incoming line #1 intersect, and the polarizing separating film 15d is deposited on the glass substrate 11' where incident light beams from the incoming line #2 and incoming line #3 intersect. Though reflecting means is provided on both sides of the optical switch, this is not illustrated.

Assume that the light incident on the four-input, four-output optical switch of FIG. 8 is horizontally polarized light (P waves). If the first through fourth electrodes E1~E4 are off, incident light which has entered from each of the incoming lines #0~#3 is outputted on the outgoing lines #0~#3, respectively, and, hence, the optical paths are not switched. However, if the first through fourth electrodes E1~E4 are on, incident light which has entered from each of the incoming lines #0, #1, #2, #3 is outputted on the outgoing lines #1, #0, #3, #2, respectively. In other words, a network illustrated in FIG. 8B is constructed by the optical switch of FIG. 8A.

If the optical switches of FIGS. 6 through 8 are suitably combined and optically coupled, the incident light beams which have entered from the incoming lines #0~#3 can be outputted on the outgoing lines #0~#3. FIG. 9 is a diagram showing a four-input, four-output network obtained by combining and optically coupling the optical switches of FIGS. 6 and 8. This network is known as a "banyan" network. Though not illustrated, a well-known cross-over network is constructed by combining and optically coupling the optical switches of FIGS. 7 and 8.

(e) Four-Input, Four-Output Optical Switch (for case in which incident light has any polarization)

Figure 10:
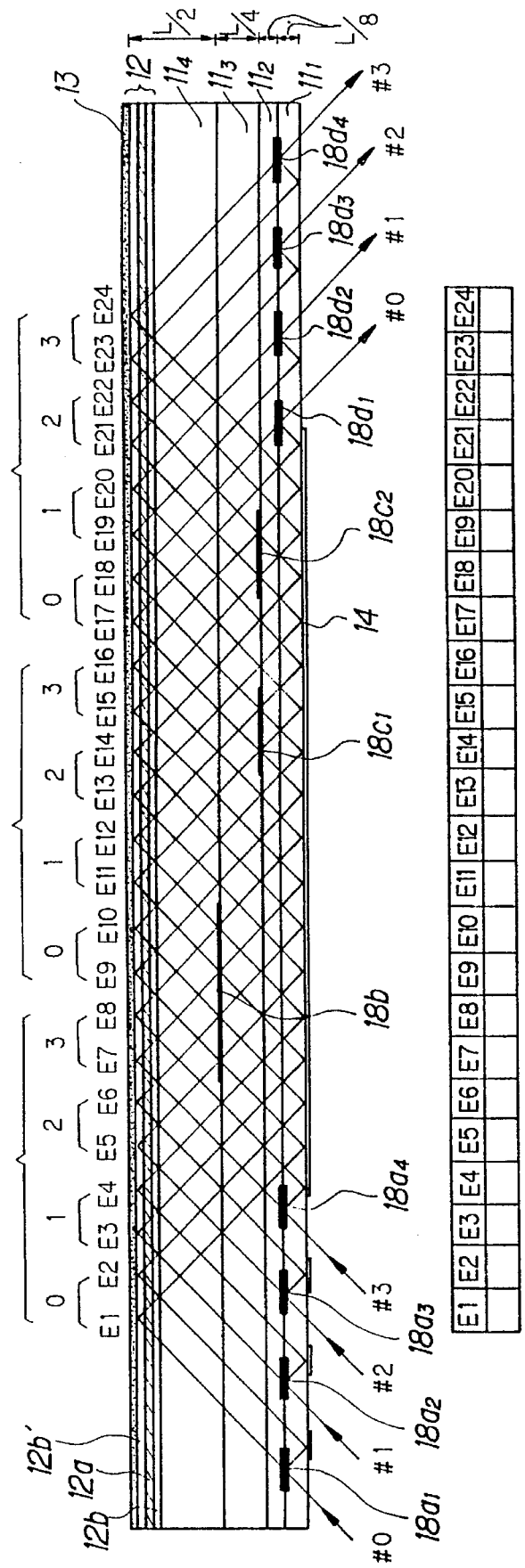
FIG. 10 is a diagram showing the construction of a four-input, four-output optical switch for a case in which incident light has any polarization.

FIG. 10 is a diagram showing the construction of a four-input, four-output optical switch for a case in which incident light has any polarization. This constructs a banyan network obtained by combining the optical switches of FIGS. 6 and 8.

Numerals $11_1$–$11_4$ denote stacked glass substrates obtained by successively stacking glass substrates. Numeral 12 denotes the polarization controller for changing the state of polarization of each incident light beam. The polarization controller 12 includes ferroelectric liquid crystal 12a and thin glass substrates 12b, 12b'. Though the details are not shown, the thin glass substrates 12b, 12b', which sandwich the liquid crystal 12a, are provided with electrodes E1, E24 at a pitch which is one-half the spacing of the incident light beams. Numerals 13, 14 denotes the reflecting films which cause incident light to propagate through the interior of the optical switch in zigzag fashion at an angle of 45° owing to reflection. The reflecting film 14 can be eliminated by utilizing total internal reflection produced by the difference in the refractive indices of glass and air. Let L represent the distance between the reflecting surfaces. The thickness of each of the glass substrates $11_1$, $11_2$ constituting the first and second layers is L/8, the thickness of the glass substrate $11_3$ constituting the third layer is L/4, and the total thickness of the glass substrate $11_4$ of the first layer and the polarization controller 12 is L/2.

Numerals $18a_1$–$18a_4$ denote polarizing separating films for separating incident light from each of the incoming lines #0–#3 into horizontally polarized light (P waves) and vertically polarized light (S waves). Numeral 18b designates a polarizing separating film constructing an optical switch equivalent to that shown in FIG. 6. Numerals $18c_1$–$18c_2$ denote polarizing separating films constructing an optical switch equivalent to that shown in FIG. 8. Numerals $18d_1$–$18d_4$ denote polarizing separating films for combining P and S waves and outputting the result on the outgoing lines #0–#3. (1) The polarizing separating film 18b is applied as a coating (deposit), by vapor deposition, on the glass substrate $11_3$ of the third layer where light beams from the incoming lines #0, #2 and #1, #3 intersect. (2) The polarizing separating film $18c_1$ is applied as a coating on the glass substrate $11_2$ of the second layer where light beams from the incoming lines #0 and #1 intersect. (3) The polarizing separating film $18c_2$ is applied as a coating on the glass substrate $11_2$ of the second layer where light beams from the incoming lines #2 and #3 intersect. It should be noted that means for controlling the angle of incident and the exit angle are deleted from the drawings.

Mutually adjacent electrodes form a pair. The first four pairs (E1, E2; E3, E4; E5, E6; E7, E8) constitute an electrode group for controlling the first stage of the optical switch, the next four pairs (E9, E10; E11, E12; E13, E14; E15, E16) constitute an electrode group for controlling the second stage of the optical switch, and the last four pairs (E17, E18; E19, E20; E21, E22; E23, E24) constitute an electrode group for combining P and S waves and outputting the results on outgoing lines #0–#3.

Figure 11:
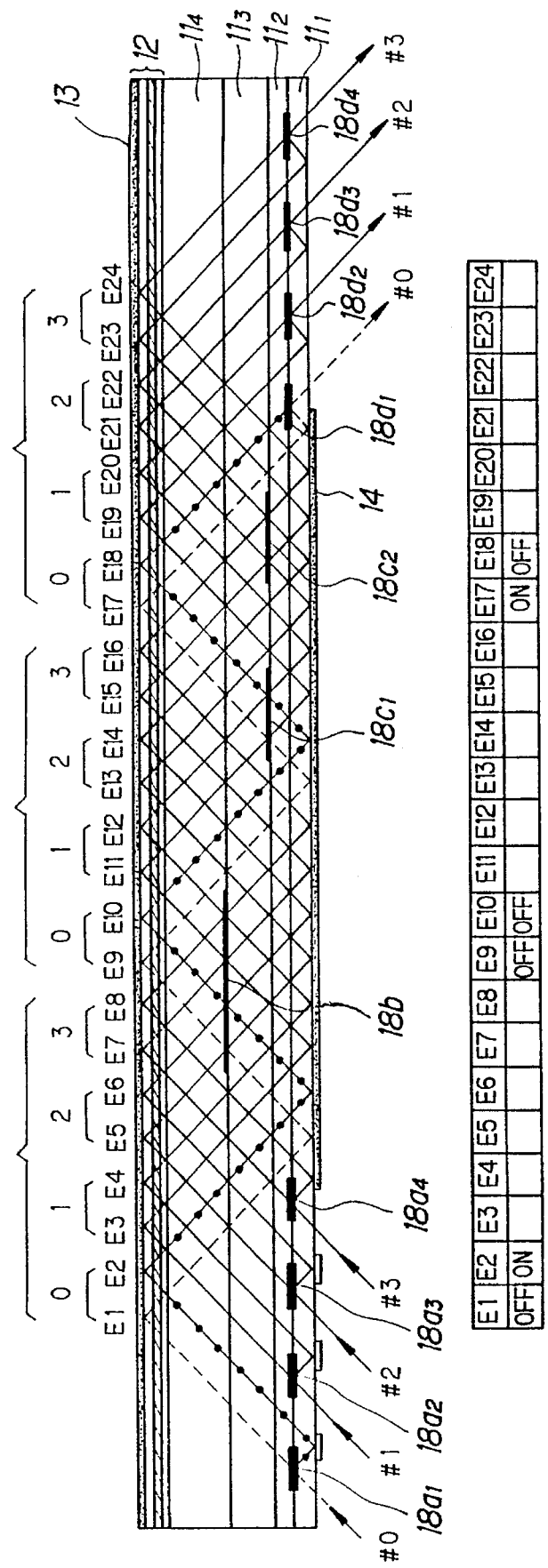
FIG. 11 is a view for describing the operation of the four-input, four-output first optical switch.

As illustrated in FIG. 11, the first electrode E1 is turned off, the second electrode E2 is turned on, the ninth and tenth electrodes E9, E10 are both turned off, the 17th electrode E17 is turned on and the 18th electrode E18 is turned off. Under these conditions, P waves of incident light which has entered from the input line #0 pass through the polarizing separating films 18a, 18b, $18c_1$ and are then polarized to S waves by the polarization controller 12 (because the electrode E17 is on), after which the S waves are reflected by the polarizing separating film $18d_1$ so as to exit from the outgoing line #0, as indicated by the dashed line in FIG. 11. Further, S waves of incident light which has entered from the input line #0 are reflected by the polarizing separating film $18a_1$ and then converted to S waves by the polarization controller 12 (because the electrode E2 is on), after which the P waves pass through the polarizing separating films 18b, $18c_1$, $18d_1$ so as to exit from the outgoing line #0, as indicated by the black circles in FIG. 11. Thus, if the electrodes are turned on and off as shown in FIG. 11, the optical path of the incident light which has entered from the incoming line #0 is not changed.

Figure 12:
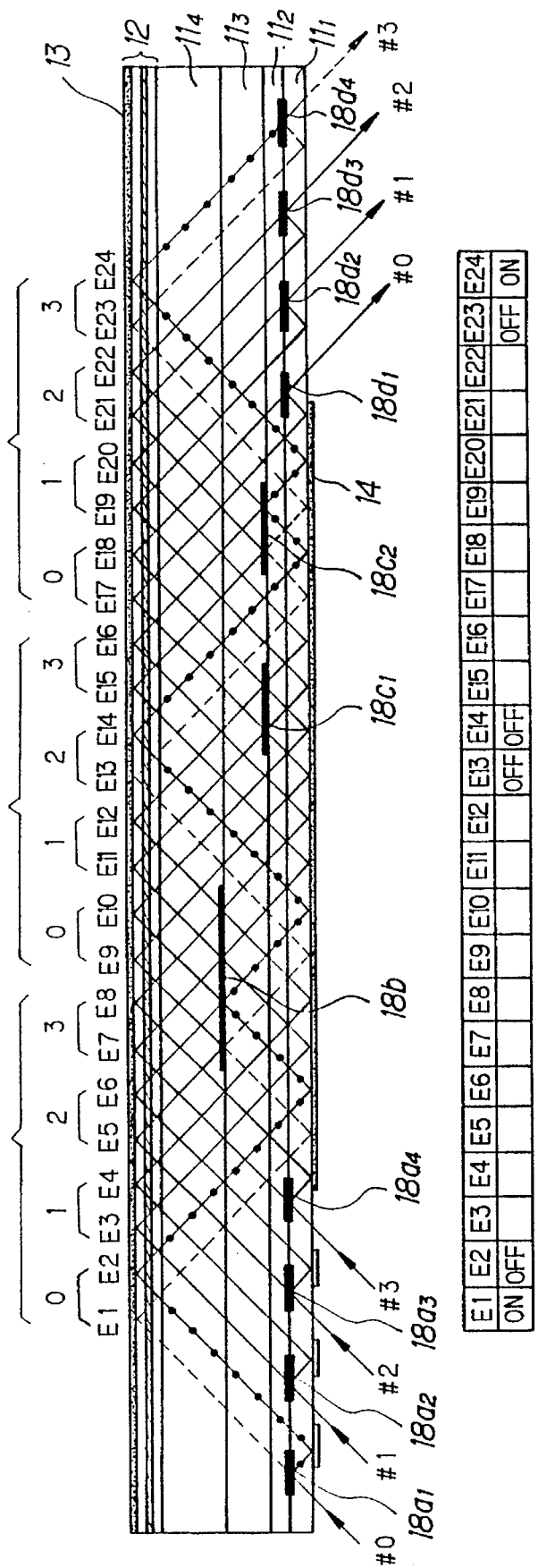
FIG. 12 is a view for describing the operation of the four-input, four-output second optical switch.

On the other hand, the first electrode E1 is turned on, the second electrode E2 is turned off, the 13th and 14th electrodes E13, E14 are both turned off, the 23rd electrode E23 is turned off and the 24th electrode E24 is turned on, as illustrated in FIG. 12. Under these conditions, P waves of incident light which has entered from the input line #0 pass through the polarizing separating film $18a_1$ and are then polarized to S waves by the polarization controller 12 (because the electrode E1 is on), after which the S waves are reflected by the polarizing separating films 18b, $18c_2$ and $18d_4$ so as to exit from the outgoing line #3, as indicated by the dashed line in FIG. 12. Further, S waves of incident light which has entered from the input line #0 are reflected by the polarizing separating films $18a_1$, 18b, $18c_2$ and then converted to P waves by the polarization controller 12 (because the electrode E24 is on), after which the P waves pass through the polarizing separating film $18d_4$ so as to exit from the outgoing line #3, as indicated by the black circles in FIG. 12. Thus, if the electrodes are turned on and off as shown in FIG. 12, the optical signal which has entered from the incoming line #0 is outputted from the outgoing line #3. Thus, the optical path can be switched.

By similarly turning electrodes on and off in appropriate fashion, an optical signal which has entered from the incoming line #0 can be outputted from outgoing lines #1, #2, and optical signals which have entered from the incoming lines #1–#3 can be outputted from any outgoing line.

(f) Other Embodiment of Four-Input, Four-Output Optical Switch

In the four-input, four-output optical switches of FIGS. 6–8, the thicknesses of the glass substrates 11 differ. This means that it is required to stack a plurality of glass substrates of different thicknesses in order to fabricate a banyan network or cross-over network by combining two optical switches (see FIG. 10).

Accordingly, if the thicknesses of the glass substrates of the optical switches can be made the same, the polarizing separating films for a plurality of optical switches can be deposited on a single glass substrate simultaneously when the plurality of optical switches are combined. This facilitates fabrication.

FIGS. 13–15 illustrate networks equivalent to those of the four-input, four-output optical switches of FIGS. 6–8, in which the networks are constructed by making the thicknesses of the glass substrates 11 identical. In each Figure, numeral 11 denotes the glass substrate, and 12 the polarization controller for changing the state of polarization of each incident light beam. The polarization controller 12 is provided with electrodes E1–E4 conforming to respective ones of the incident light beams. The polarization controller 12 is illustrated in simplified form but has the same construction as the polarization controller shown in FIG. 2. Numerals 15e, 15f represent polarizing separating films deposited on the glass substrates 11 at prescribed positions at which two incident light beams intersect. Though reflecting means is provided on both sides of the optical switch, this is not illustrated.

In each of FIGS. 13, 14, and 15, the thicknesses of the glass substrates 11 are identical and the thicknesses of the polarization controllers are identical. However, the lengths of the polarizing separating films 15e, 15f differ as well as the positions at which they are deposited.

As shown in FIG. 13, the polarizing separating films 15e, 15f are deposited at different positions on the glass substrate 11 at which incident light beams from the incoming lines #0 and #1 intersect, incident light beams from the incoming lines #1 and #2 intersect and incident light beams from the incoming lines #2 and #3 intersect. Accordingly, if the incident light is horizontally polarized light (P waves) and the first through fourth electrodes E1~E4 are off, the incident light beams which have entered from the incoming lines #0~#3 are outputted on the outgoing lines #0~#3, respectively. Thus, the optical paths are not switched. However, if the first through fourth electrodes E1~E4 are on, the incident light beams which have entered from the incoming lines #0, #1, #2, #3 are outputted on the outgoing lines #2, #3, #0, #4, respectively. In other words, the network illustrated in FIG. 13B (the same as in FIG. 6B) is constructed by the optical switch of FIG. 13A.

As shown in FIG. 14, the polarizing separating film 15e is deposited on the glass substrate 11 where incident light beams from the incoming lines #1 and #2 intersect, and the polarizing separating film 15f is deposited on the glass substrate 11 where incident light beams from the incoming lines #0 and #3 intersect. Accordingly, if the incident light is horizontally polarized light (P waves) and the first through fourth electrodes E1~E4 are off, the incident light beams which have entered from the incoming lines #0~#3 are outputted on the outgoing lines #0~#3, respectively. Thus, the optical paths are not switched. However, if the first through fourth electrodes E1~E4 are on, the incident light beams which have entered from the incoming lines #0, #1, #2, #3 are outputted on the outgoing lines #3, #2, #1, #0, respectively. In other words, the network illustrated in FIG. 14B (the same as in FIG. 7B) is constructed by the optical switch of FIG. 14A.

As shown in FIG. 15, the polarizing separating film 15e is deposited on the glass substrate 11 where incident light beams from the incoming lines #0 and #1 intersect, and the polarizing separating film 15f is deposited on the glass substrate 11 where incident light beams from the incoming lines #2 and #3 intersect. Accordingly, if the incident light is horizontally polarized light (P waves) and the first through fourth electrodes E1~E4 are off, the incident light beams which have entered from the incoming lines #0~#3 are outputted on the outgoing lines #0~#3, respectively. Thus, the optical paths are not switched. However, if the first through fourth electrodes E1~E4 are on, the incident light beams which have entered from the incoming lines #0, #1, #2, #3 are outputted on the outgoing lines #1, #0, #3, #2, respectively. In other words, the network illustrated in FIG. 15B is constructed by the optical switch of FIG. 15A.

Thus, as set forth above, the thicknesses of the glass substrates 11 of the four-input, four-output optical switches can be made the same. As a result, in a case where two optical switches are combined to construct an integrated optical switch of a prescribed network, fabrication is facilitated and fabrication accuracy is improved.

(g) Construction of Optical Distributor

Figure 16:
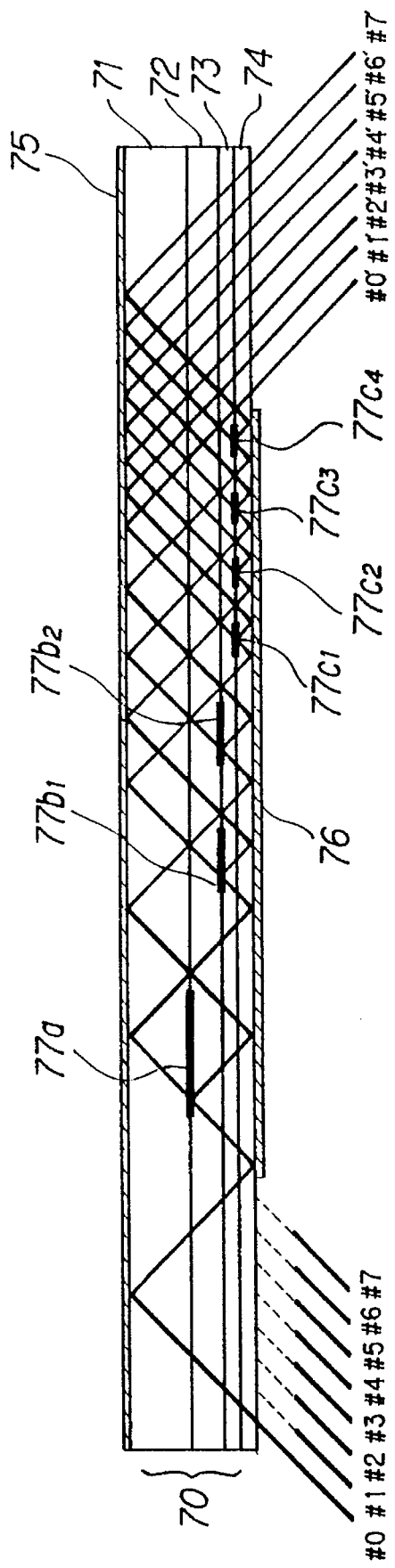
FIG. 16 is a diagram showing the construction of an optical distributor.

FIG. 16 is a diagram showing the construction of an optical distributor according to the present invention. The optical distributor according to the invention includes a stacked optical transmission member 70 obtained by stacking a plurality of parallel plate-shaped glass substrates 71~74. The thickness of the uppermost glass substrate 71 is one-half the total thickness; the thickness of the glass substrate 72 second from the top is $\frac{1}{2}^2$ the total thickness; and the thickness of the glass substrate 73 third from the top and of the lowermost glass substrate 74 is $\frac{1}{2}^3$ the total thickness. Numerals 75, 76 denote first and second reflecting films provided on both sides of the stacked optical transmission member 70 in such a manner that incident light propagates in zigzag fashion owing to reflection (the reflecting films can be eliminated by arranging it so that total internal reflection is produced by the difference between the refractive indices of the glass and air). Numerals $77a$, $77b_1$~$77b_2$, $77c_1$~$77c_4$ represent partial reflecting films provided on the glass substrates where two prescribed incident light beams intersect owing to reflection. More specifically, (1) the partial reflecting film $77a$ is provided on the glass substrate 72, which is the second layer, where incident light beams from the incoming lines #0 and #4, #1 and #5, #2 and #6 and #3 and #7 intersect. (2) The partial reflecting film $77b_1$ is provided on the glass substrate 73, which is the third layer, where incident light beams from the incoming lines #0 and #2 intersect as well as the light beams from incoming lines #1 and #3. (3) The partial reflecting film $77b_2$ is provided on the glass substrate 73, which is the third layer, where incident light beams from the incoming lines #4 and #6 intersect as well as the light beams from incoming lines #5 and #7. (4) The partial reflecting films $77c_1$~$77c_4$ are provided on the glass substrate 74, which is the lowermost layer, where incident light beams from the incoming lines #0 and #1, #2 and #3, #4 and #5 and #6 and #7, respectively, intersect.

Incident light from a prescribed incoming line is caused to branch into two beams by the first partial reflecting film $77a$, the incident light beams resulting from branching are each caused to branch into two beams by respective ones of the second partial reflecting films $77b_1$, $77b_2$, for a total of $2^2$ light beams resulting from branching, and each of these lights beams resulting from branching is caused to branch in into two beams by respective ones of the third partial reflecting films $77c_1$~$77c_4$, for a total of $2^3$ light beams.

Thus, light which has entered from a prescribed incoming line can be distributed on eight lines (#0'~#7'). Further, the number of light distributions can be increased by increasing the number of stacked glass substrates. Furthermore, light incident from each incoming line can be distributed accurately to the same outgoing-line position.

(h) Optical Switch Using Optical Distributor

The thicknesses of the glass substrates in the optical distributor of FIG. 16 are designed in such a manner that distribution of light can be performed for an incident beam array having a spacing of, say, 5 mm. If a light beam array is introduced to such an optical distributor at a spacing of 5.1 mm from the incoming lines #0~#7, branched beams are arrayed at a spacing of 0.1 mm on the exit side.

Figure 17:
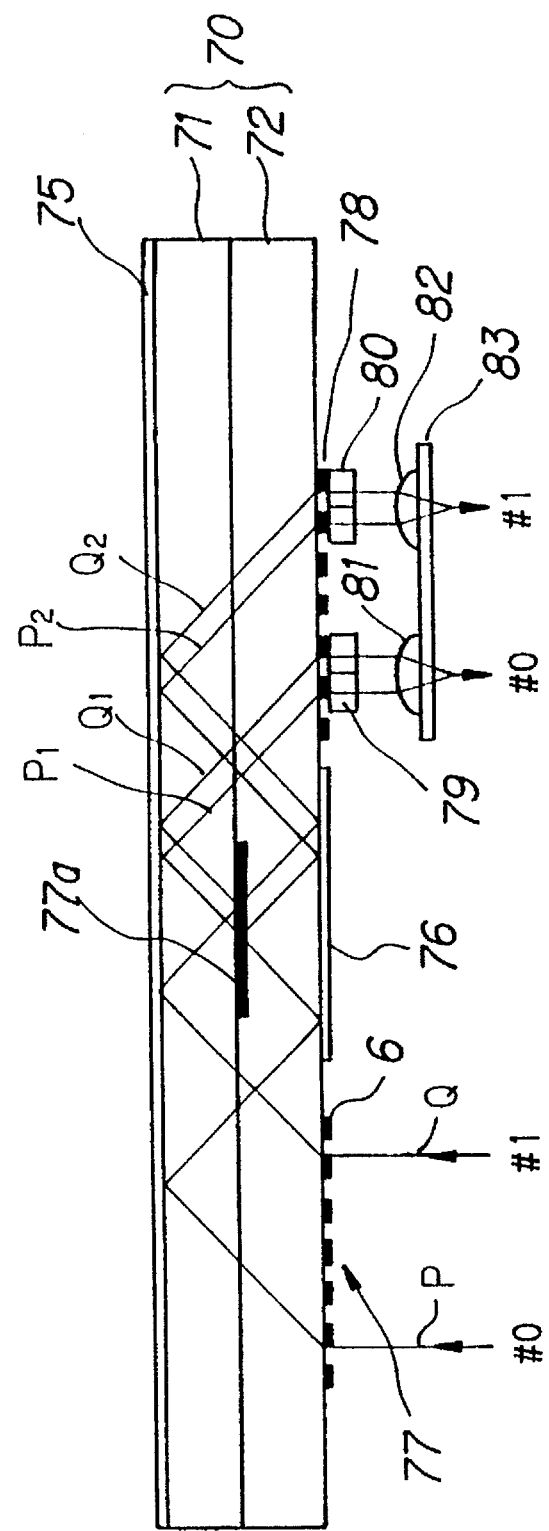
FIG. 17 is a diagram showing the construction of an optical switch using the optical distributor.

FIG. 17 is a diagram showing the construction of a two-input, two-output optical switch using such a principle. Numeral 70 denotes the stacked optical transmission member obtained by stacking parallel plate-shaped glass substrates 71, 72 of identical thickness. Numerals 75, 76 denote the first and second reflecting films provided on both sides of the stacked optical transmission member 70 in such a manner that incident light propagates in zigzag fashion owing to reflection (the reflecting films can be eliminated by arranging it so that total internal reflection is produced by the difference between the refractive indices of the glass and air). Numeral 77a represents the partial reflecting film provided on the glass substrate 72. Incident light P from the incoming line #0 is branched into two beams (P1, P2), and incident light Q from the incoming line #1 is branched into two beams (Q1, Q2). Numerals 77, 78 denote diffraction gratings provided at an optical input portion and at an optical output portion, respectively. The direction of advance of light incident at right angles is changed by 45° by the diffraction grating 77 before exiting, and the direction of advance of light incident at 45° is changed by 90° by the diffraction grating 78 before exiting. Numeral 79 represents a first optical shutter provided to correspond to the branched beams P1, Q1, and numeral 80 represents a second optical shutter provided to correspond to the branched beams P2, Q2. The optical shutters 79, 80 are each composed of liquid crystal and function to pass one branched beam and block the other under external control. Numerals 81, 82 designate converging lenses provided on a glass substrate 83.

If the spacing of the incident light beams P, Q which enter from the incoming lines #0, #1 is so decided that the branched light beams will not overlap, the incident light beams P, Q become a total of four light beams P1, P2, Q1, Q2 by virtue of the partial reflecting film 77a. These light beams are arrayed in the order P1, Q1, P2, Q2, as illustrated. Accordingly, if the optical shutters 79, 80 are controlled so as to pass only the branched light beams P1, Q2, the branched light beams P1, Q2 are converged by the converging lenses 81, 82 and are then outputted from the outgoing lines #0, #1. In this case, the optical paths are not switched. However, if the optical shutters 79, 80 are controlled so as to pass only the branched light beams Q1, P2, the branched light beams Q1, P2 are converged by the converging lenses 81, 82 and are then outputted from the outgoing lines #0, #1. In this case, the optical paths are switched.

The foregoing is for a case in which there are two inputs and two outputs. However, if it is so arranged that there are n-number of inputs, the branched light beams of each of these inputs do not overlap and prescribed branched light beams are selected by optical shutters, then an n-input, n-output optical switch can be constructed.

Figure 18:
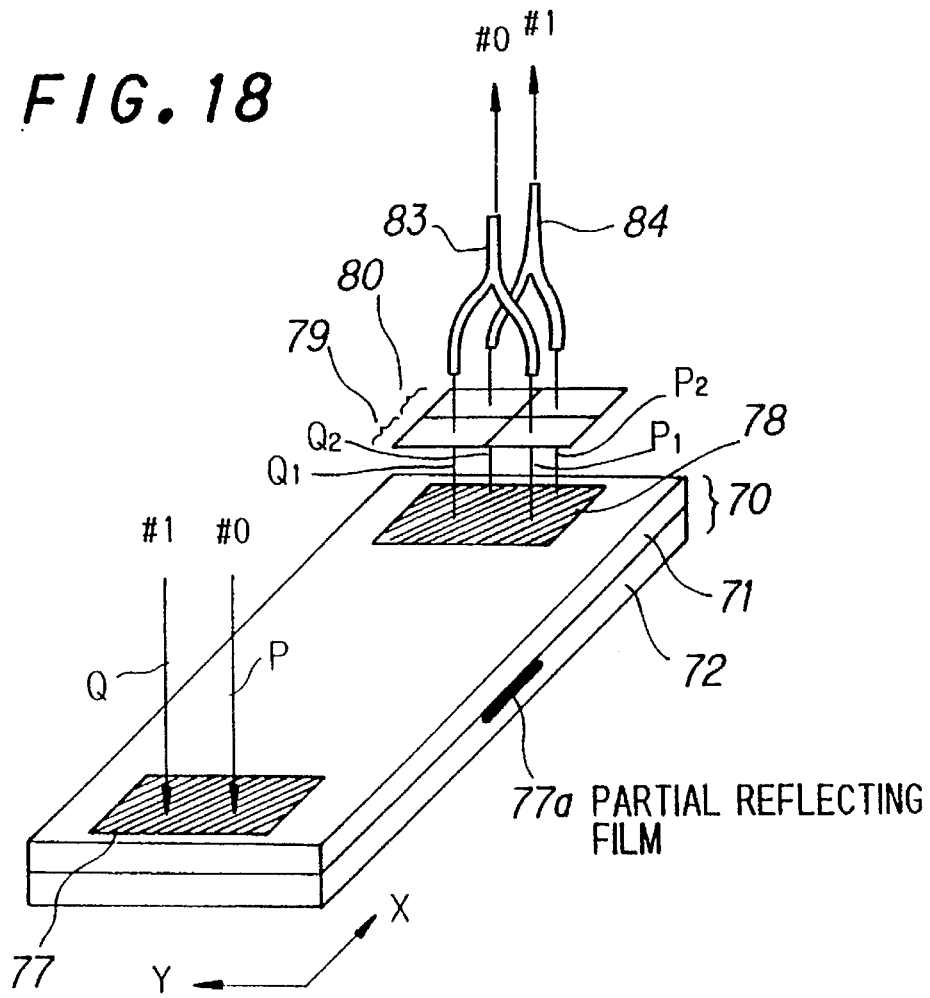
FIG. 18 is a diagram showing another construction of an optical switch using the optical distributor.

FIG. 18 is a diagram showing the construction of another embodiment of an optical switch using an optical distributor.

With the optical switch of FIG. 17, the incident light beams enter in a row along the longitudinal direction (X direction) of the substrate. This means that though the spacing between the branched light beams can be enlarged in the optical switch of FIG. 17 if the number of incident beams is small, the spacing diminishes if the number of incident light beams increases. This makes it difficult to select branched light beams by the optical shutters.

Accordingly, in the optical switch of FIG. 18, incident light beams impinge upon the substrate in a row along a direction (Y direction) which perpendicularly intersects the longitudinal direction of the substrate. Numeral 70 denotes the stacked optical transmission member obtained by stacking the parallel plate-shaped glass substrates 71, 72 of identical thickness. Numeral 77a represents the partial reflecting film provided on the glass substrate 72. Incident light P from the incoming line #0 is branched into two beams (P1, P2), and incident light Q from the incoming line #1 is branched into two beams (Q1, Q2). Numerals 77, 78 denote diffraction gratings provided at an optical input portion and at an optical output portion, respectively. The direction of advance of light incident at right angles is changed by 45° by the diffraction grating 77 before exiting, and the direction of advance of light incident at 45° is changed by 90° by the diffraction grating 78 before exiting. Numeral 79 represents a first optical shutter provided to correspond to the branched beams P1, Q1, and numeral 80 represents a second optical shutter provided to correspond to the branched beams P2, Q2. The optical shutters 79, 80 are each composed of liquid crystal and function to pass one branched beam and block the other under external control. Numerals 83, 84 designate photocouplers for introducing light beams, which have passed through the optical shutters 79, 80, to outgoing lines #0, #1. Though reflecting members are provided on both sides of the stacked optical transmission member 70, these are not illustrated.

The incident light beams P, Q are converted to a total of four incident light beams P1, P2, Q1, Q2 by the partial reflecting film 77a. These light beams are arrayed in two dimensions as shown. If the electronic shutters 79, 80 are controlled under these conditions in such a manner that only the branched light beams P1, Q2 are passed, the branched beams P1, Q2 are converged by the photocouplers 83, 84 and then exit from the outgoing lines #0, #1. In this case the optical paths are not switched. However, if the electronic shutters 79, 80 are controlled in such a manner that only the branched light beams Q1, P2 are passed, the branched beams Q1, P2 are converged by the photocouplers 83, 84 and then exit from the outgoing lines #0, #1. Thus, the optical paths are switched.

The foregoing is for a case in which there are two inputs and two outputs. However, if it is so arranged that n-number of incident light beams are lined up in the Y direction and prescribed branched light beams are selected by optical shutters, then an n-input, n-output optical switch can be constructed.

(i) Optical Switch for Light Incident in Two Dimensions

Figure 19:
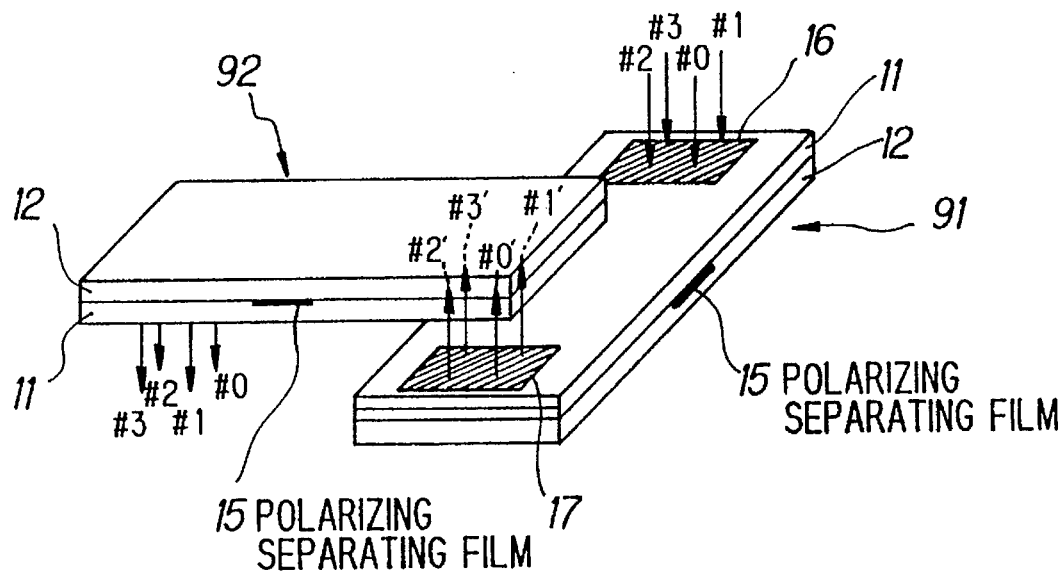
FIG. 19 is a diagram showing the construction of an optical switch for a case in which light is incident in two dimensions.

In the four-input, four-output optical switches shown in FIGS. 6 through 15, the incident light beams enter in a row along the longitudinal direction (X direction) of the substrate. However, there are also cases in which incident light beams enter in a two-dimensional array. FIG. 19 illustrates the construction of an optical switch for a case in which light is incident in two dimensions. Numerals 91, 92 denote optical switches each of which is constructed as shown in FIG. 2. The optical switches 91, 92 are arranged to perpendicularly intersect each other. Numeral 11 denotes the glass substrate, 12 the parallel plate-shaped polarization controller, 15 the polarizing separating film, and 16, 17 diffraction gratings provided at an optical input portion and at an optical output portion, respectively. The direction of advance of light incident at right angles is changed by 45° by the diffraction grating 16 before exiting, and the direction of advance of light incident at 45° is changed by 90° by the diffraction grating 17 before exiting. Reflecting films provided on both surfaces of the optical switches 91, 92 are deleted.

The optical switch 91 receives an incident light beam from incoming line #0 and controls the polarization thereof so that light exits from outgoing line #0' or #1'. Further, the optical switch 92 receives an incident light beam from incoming line #0' and controls the polarization thereof so that light exits from outgoing line #1 or #3, and receives an incident light beam from incoming line #1' and controls the polarization thereof so that light exits from outgoing line #0 or #2. Accordingly, an incident light beam from the incoming line #0 can be outputted from any of the outgoing lines #0~#3 by polarization control performed by the optical switches 91, 92. Similarly, an incident light beam from any incoming line can be outputted from any of the outgoing lines #0–#3. A four-input, four-output optical switch upon which light impinges two-dimensionally is constructed as shown in FIG. 19.

The foregoing is for a case in which a four-input, four-output optical switch is constructed by arranging two-input, two-output optical switches 91, 92 shown in FIG. 2 at right angles to each other in three dimensions. However, if the four-input, four-output banyan network of FIG. 9, for example, is used as the optical switches 91, 92, a (4×4)-input, (4×4)-output optical switch can be constructed.

Similarly, by providing two optical distributors and arranging them to perpendicularly intersect in such a manner that the optical output portion of the first optical distributor and the optical input portion of the second optical distributor overlap, incident light beams can be outputted distributively in two dimensions from the optical output portion of the second optical distributor.

(j) Transmission-Type Optical Switch

FIG. 20 is a diagram showing the construction of a transmission-type optical switch. As shown in FIG. 1B, the transmission-type optical switch includes rectangular parallelepiped polarizing prisms 51, 52 each having an apex angle of 45°, and plate-shaped polarization controllers 53, 54 provided in front of the polarizing prisms 51, 52, respectively, for controlling the state of polarization of incident light. The polarizing prisms 51, 52 include stacked glass substrates 51a, 51b; 52a, 52b, respectively, first and second reflecting films 51c, 51d; 52c, 52d provided on each of the glass substrates on the sides opposite the superimposed side in such a manner that incident light propagates in zigzag fashion owing to reflection (the reflecting films can be eliminated by arranging it so that total internal reflection is produced by the difference between the refractive indices of glass and air), and polarizing separating films 51e, 52e, 52e' vapor-deposited on the glass substrates where two prescribed incident light beams intersect owing to reflection, thereby passing horizontally polarized light and reflecting vertically polarized light. The polarizing separating film 51e of the polarizing prism 51 is vapor-deposited on the glass substrate 51a where incident light beams from incoming line #0 and incoming line #2 intersect and where incident light beams from incoming line #1 and incoming line #3 intersect. The polarizing separating film 52e of the polarizing prism 52 is vapor-deposited on the glass substrate 52a, where incident light beams from incoming line #0 and incoming line #1 intersect, and the polarizing separating film 52e' of the polarizing prism 52 is vapor-deposited on the glass substrate 52a where incident light beams from incoming line #2 and incoming line #3 intersect.

Figure 24A:
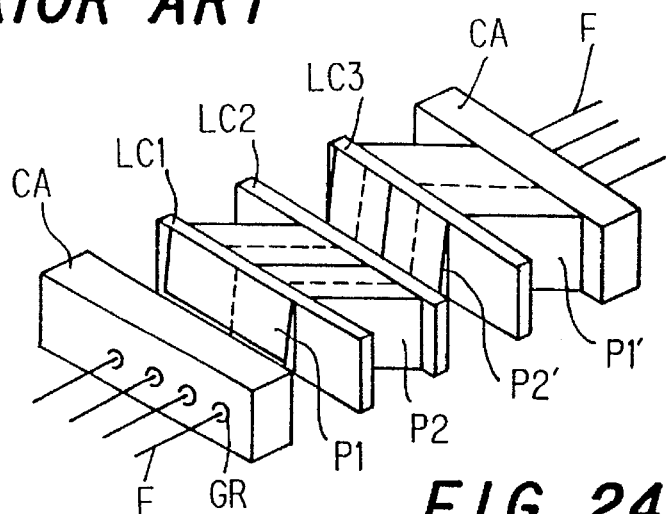
Figure 24B:
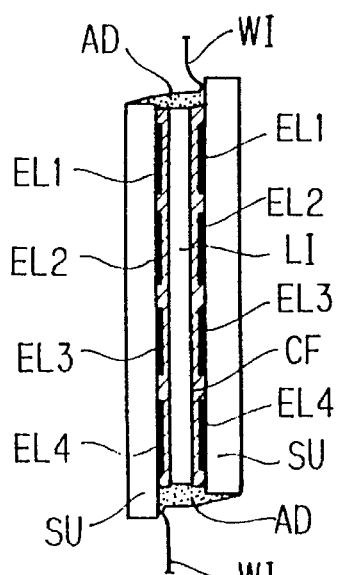
Figure 24C:
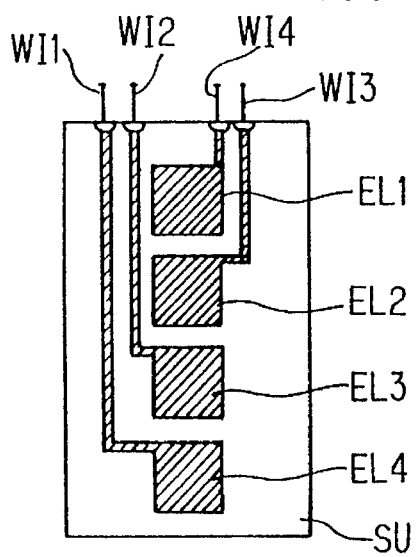
Figure 24D:
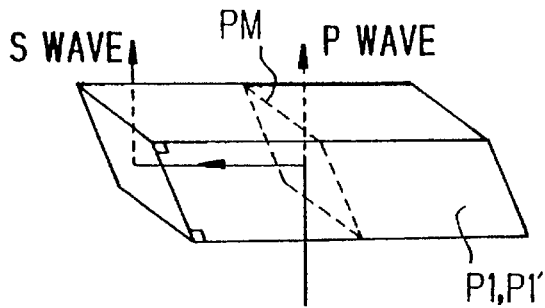
Figure 24E:
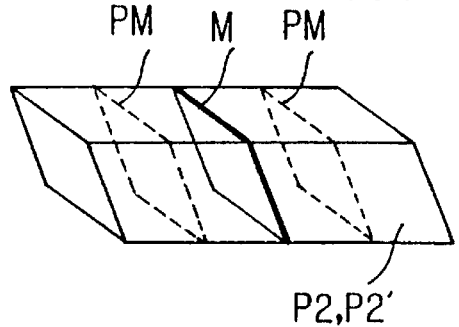
Figure 25A:
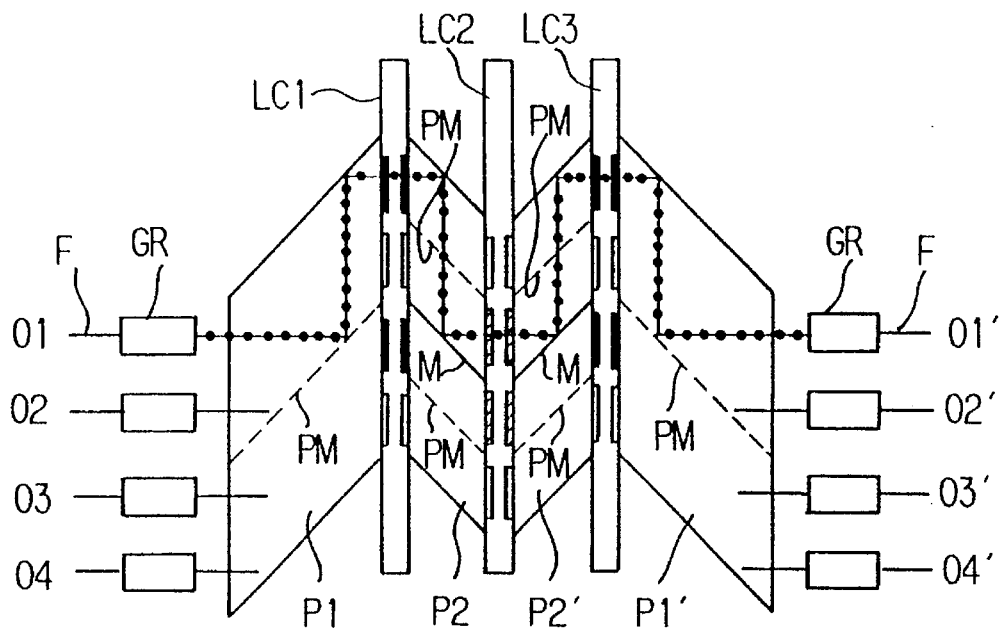
FIGS. 25A, 25B are views for describing the operation of a transmission-type optical switch according to the prior art.
Figure 25B:
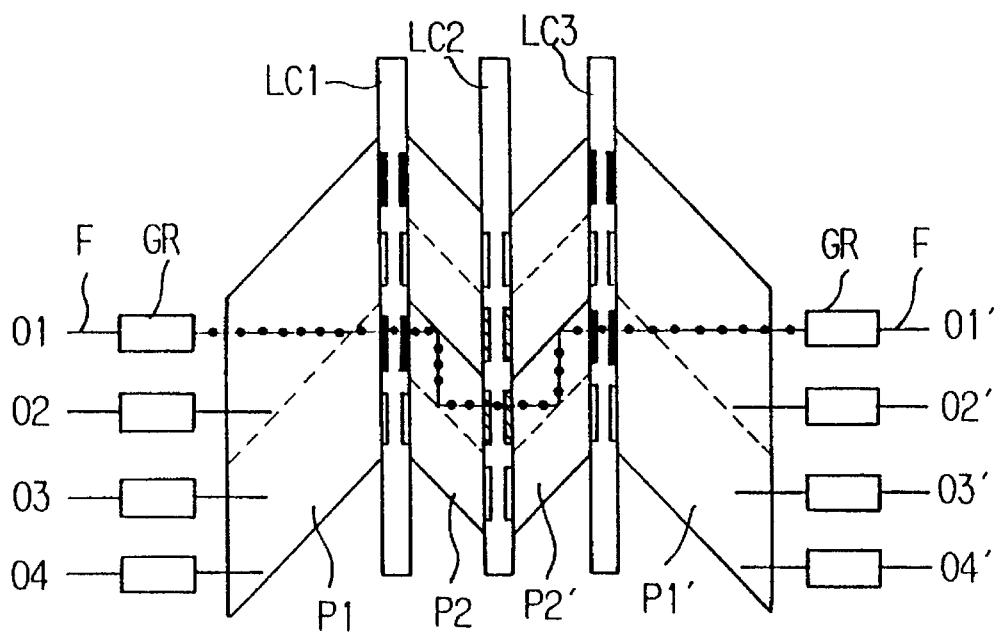

The polarization controllers 53, 54 have a construction identical with that shown in FIGS. 24B and 24C (here the liquid crystal is ferroelectric liquid crystal). The polarization controllers 53, 54 are each provided with electrodes E1~E4 to correspond to respective ones of the incoming lines #0–#3.

As shown in FIG. 20B, the polarizing prism 51 is obtained by depositing the polarizing separating film 51e on the glass substrate 51a where incident light beams from incoming lines #0 and #2 intersect and incident light beams from incoming lines #1 and #3 intersect, stacking the glass substrate 51b on the glass substrate 51a, coating both surfaces of the resulting stack with the reflecting films 51c 51d to construct a parallel plate-shaped member, and then cutting off the member at an incline of 45°.

As shown in FIG. 20C, the polarizing prism 52 is obtained by depositing the polarizing separating film 52e on the glass substrate 52a, where incident light beams from incoming lines #0 and #1 intersect, depositing the polarizing separating film 52e' on the glass substrate 52a, where incident light beams from incoming lines #2 and #3 intersect, stacking the glass substrate 52b on the glass substrate 52a, coating both surfaces of the resulting stack with the reflecting films 52c 52d to construct a parallel plate-shaped member, and then cutting off the member at an incline of 45°.

Assume that the incident light is horizontally polarized light (P waves). (1) In a state in which the first electrodes E1, E1 of each of the polarization controllers 53, 54 have been turned off, light of the P-wave component incident from the incoming line #0 passes through the polarizing separating films 51e, 52e and is reflected by each of the reflecting films so as to exit from the outgoing line #0. (2) In a state in which the first electrode E1 of the polarization controller 53 has been turned off and the first electrode E1 of the polarization controller 54 has been turned on, the light incident from the incoming line #0 is outputted from outgoing line #1. (3) In a state in which the first electrode E1 of the polarization controller 53 has been turned on and the third electrode E3 of the polarization controller 54 has been turned on, the light incident from the incoming line #0 is outputted from outgoing line #2. (4) In a state in which the first electrode E1 of the polarization controller 53 has been turned on and the third electrode E3 of the polarization controller 54 has been turned off, the light incident from the incoming line #0 is outputted from outgoing line #3. Thus, an output can be obtained on any outgoing line, and optical path can be switched, by controlling the state of polarization of the incident light using the polarization controllers 53, 54. Light from the other incoming lines #1–#3 also can be outputted on any of the outgoing lines in the same fashion.

Thus, as set forth above, an optical switch of a four-input, four-output banyan network can be constructed by the two polarizing prisms 51, 52. It is possible to reduce the number of polarizing prisms by two in comparison with the transmission-type optical switch of the prior art (see FIG. 24A), thus providing a compact arrangement even for a multiple-channel device.

Further, the polarizing prisms are fabricated upon deciding the number of the polarizing separating films, the length of each polarizing separating film and the position at which it is deposited in dependence upon the network configuration, and polarization of each incident light beam is controlled by the polarization controller before the light beam arrives at the polarizing separating film, thereby making it possible to construct an optical switch for any network. By optically cascade-connecting a plurality of optical switches conforming to each type of network configuration, a transmission-type optical switch of a cross-over network or the like can be simply constructed.

Furthermore, a transmission-type optical switch of a banyan network or cross-over network can be constructed with ease by combining polarizing prisms obtained by being cut, at an inclination of 45°, from a parallel plate-shaped member in which the polarization controllers 12 shown in FIGS. 13~15 are replaced by glass substrates.

Figure 21:
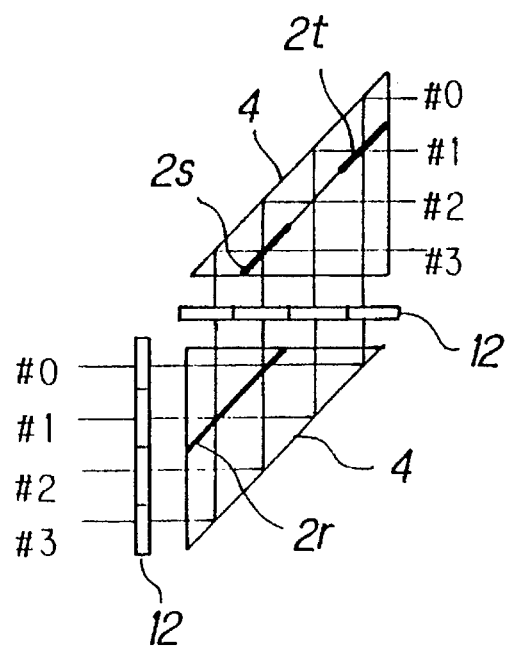
FIG. 21 is a structural view showing a modification of a transmission-type switch according to the present invention.

The polarizing prisms 51, 52 of FIG. 20 are cut into rectangular parallelepipeds. The portion of polarizing prism 51 above the dashed line is for reflecting upwardly directed incident light to the right. The portion of polarizing prism 52 below the dashed line is for reflecting downwardly directed incident light to the right. Accordingly, even if the upper half of the polarizing prism 51 is removed to form a triangular prism, the lower half of the polarizing prism 52 is removed to form a triangular prism and the two prisms are arranged as shown in FIG. 21, a transmission-type optical switch entirely equivalent to that of FIG. 20 can be constructed.

(k) Other construction of transmission-type optical switch

The foregoing is for a case in which a transmission-type optical switch is constructed using polarizing prisms employing polarizing separating films. However, a transmission-type optical switch can also be constructed using partial reflecting film. In this case, a partial reflecting prism is formed by cutting the optical distributor shown in FIG. 16 into rectangular parallelepiped or triangular prism having an apex angle of 45°, the partial prisms are arranged in the same manner as depicted in FIG. 20 or 21, and the output side of the final polarizing prism is provided with an optical shutter and converging means (a condensing lens, photocoupler, etc.) shown in FIG. 17.

Figure 22:
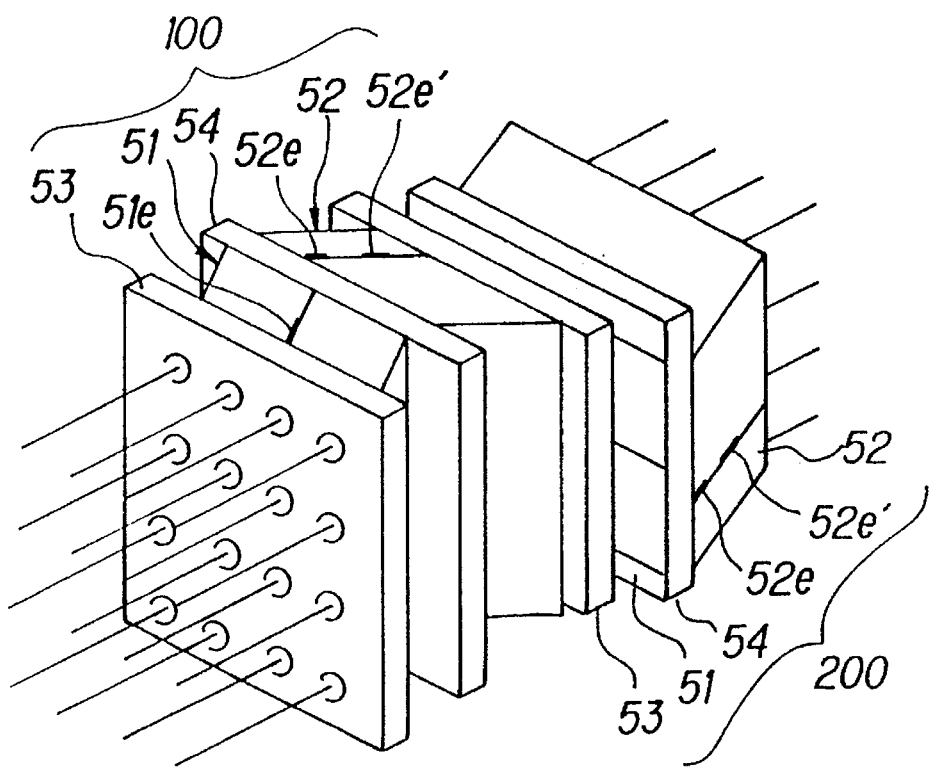
FIG. 22 is a diagram showing the construction of a transmission-type optical switch for a case in which light is incident in two dimensions.
Figure 23A:
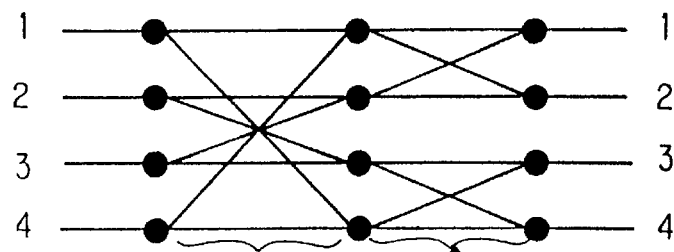
Figure 23B:
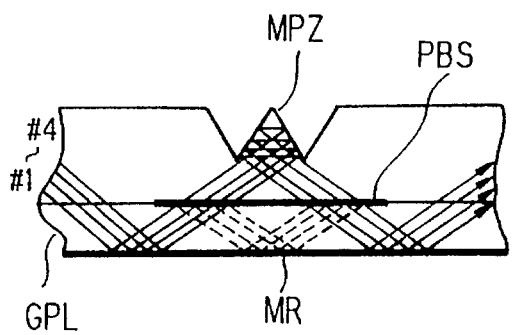
Figure 23C:
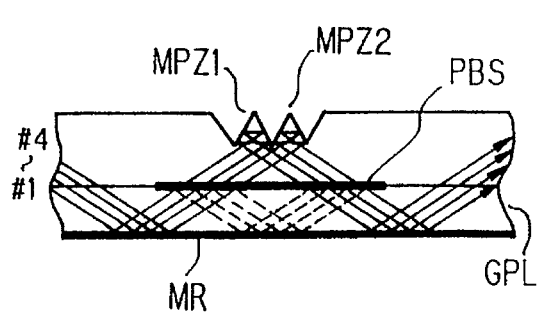
Figure 23D:
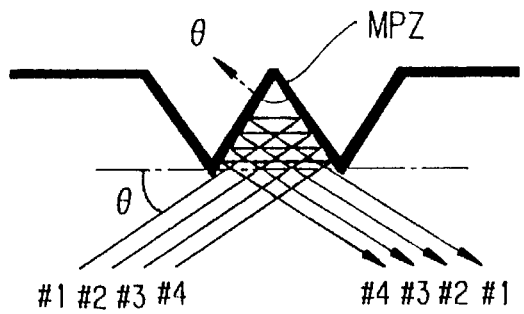
Figure 23E:
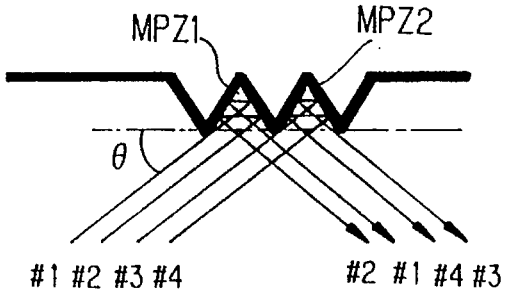

(m) Construction of Transmission-Type Optical Switch for Light Incident in Two Dimensions FIG. 22 is a diagram showing the construction of a (4×4)-input, (4×4)-output transmission-type optical switch for a case in which light is incident in two dimensions. Here light-transmission switches 100, 200 of the kind shown in FIG. 20 are offset by 90° and arranged so as to be optically coupled three-dimensionally. Vertical switching is performed by the optical switch 100 constituting the first stage, horizontal switching is performed by the optical switch constituting the second stage, and incident light from any incoming line can be outputted on any outgoing line.

Thus, in accordance with the reflection-type optical switch of the present invention, the optical switch comprises a plate-shaped optical transmission member, a polarization controller stacked on the optical transmission member for controlling polarization of incident light, reflecting means provided on the optical transmission member and polarization controller, respectively, in such a manner that the incident light propagates in zigzag fashion owing to reflection, and a polarizing separating film provided at a position at which two prescribed incident light beams intersect owing to reflection, wherein state of polarization of each incident light beam is controlled by the polarization controller before the light beam arrives at the polarizing separating film, thereby controlling an optical path of each incident light beam. As a result of this arrangement, optical path can be switched without providing a microprism, as is done in reflection-type optical switches according to the prior art. This makes it possible to fabricate an optical such more simply.

Further, in accordance with the reflection-type optical switch according to the present invention, a second polarizing separating film for separating incident light into vertically polarized light and horizontally polarized light is provided on an optical input portion of the optical switch, incident light is separated into P and S waves by the second polarizing separating film, the states of polarization of the P and S waves are controlled by respective polarization controllers, and the optical path of each component subjected to control of state of polarization is switched by the polarizing separating film. As a result of this arrangement, the optical path can be switched by the polarizing separating film regardless of the state of polarization of the incident light. Moreover, the lengths of the optical paths of the P and S waves can be made identical.

Furthermore, in accordance with the reflection-type optical switch of the present invention, by appropriately determining the number of polarizing separating films, the length of each polarizing separating film and deposited positions (pattern), an optical switch for any network configuration can be fabricated. Moreover, by integrally forming a plurality of switches conforming to various network configurations in such a manner that the optical switches are optically coupled, an optical switch of a banyan network or crossover network can be simply constructed.

Further, in accordance with the reflection-type optical switch of the present invention, it is so arranged that the optical output portion of a first optical switch and the optical input portion of a second optical switch overlap, and so that the switches perpendicularly intersect. As a result, the optical paths of optical signals incident upon the optical input portion of the first optical switch in two dimensions can be switched in two dimensions.

In accordance with a transmission-type optical switch according to the present invention, a polarization controller for controlling the state of polarization of incident light is provided in front of a polarizing prism obtained by providing a polarizing separating film at a position at which two prescribed incident light beams intersect owing to reflection. The state of polarization of each incident light beam is controlled by the polarization controller before the light beam arrives at the polarizing separating film. As a result, an optical switch can be constructed from fewer polarizing prisms in comparison with the conventional transmission-type optical switch, and the device can be made compact even in case of multiple-channel applications.

Further, in accordance with the transmission-type optical switch of the present invention, polarizing prisms are fabricated upon deciding, in conformity with the network configuration, the number of the polarizing separating films, the length of each polarizing separating film and position at which it is deposited, and the state of polarization of each incident light beam is controlled by the polarization controller before the light beam arrives at the polarizing separating film, thereby making it possible to switch the optical path of each incident light beam. As a result, by optically cascade-connecting a plurality of optical switches conforming to each type of network configuration, an optical switch of a banyan network or cross-over network can be simply constructed.

Furthermore, in accordance with the transmission-type optical switch of the present invention, a polarizing prism can be fabricated in a simple manner by fabricating an optical member comprising stacked parallel plate-shaped glass substrates, first and second reflecting means provided on each glass substrate in such a manner that incident light propagates in zigzag fashion owing to reflection, and polarizing separating films deposited on the glass substrates where two prescribed incident light beams intersect owing to reflection, and then cutting this optical member to a desired shape.

In accordance with an optical distributor according to the present invention, a partial reflecting film is provided at a position on the laminated surface of an optical transmission member at which two prescribed incident light beams intersect owing to reflection. As a result of this arrangement, the optical distributor can be constructed in a simple manner. Moreover, light incident from incoming lines #1–#n can be distributed to the same position.

Further, in accordance with the optical distributor of the present invention, the number of optical distributors can be increased in a simple manner by increasing the number of stacked layers. Furthermore, incident light can be outputted distributively in two dimension.

As many apparently widely different embodiments of the present invention can be made without departing from the spirit and scope thereof, it is to be understood that the invention is not limited to the specific embodiments thereof except as defined in the appended claims.

What is claimed is:

1. An optical switch for switching optical path of incident light, comprising:

a plate-shaped optical transmission member;

a plate-shaped polarization controller stacked on said optical transmission member for controlling state of polarization of the incident light;

first and second reflecting means provided on said optical transmission member and said polarization controller, respectively, in such a manner that the incident light advances in zigzag fashion owing to reflection; and a polarizing separating film (first polarizing separating film) provided at a position at which two prescribed incident light beams intersect owing to reflection;

wherein state of polarization of each incident light beam is controlled by said polarization controller before the light beam arrives at said polarizing separating film, thereby controlling the optical path of each incident light beam.

2. The optical switch according to claim 1, wherein said polarizing separating film is deposited on said optical transmission member at said position of intersection.

3. The optical switch according to claim 2, wherein thickness of said optical transmission member is made uniform, a plurality of said first polarizing separating films are provided, length of each first polarizing separating film and deposited position thereof are decided in conformity with a network configuration of the optical switch, and optical paths of a plurality of incident light beams are controlled.

4. The optical switch according to claim 2, further comprising a second polarizing separating film for separating incident light into horizontally polarized light and vertically polarized light, wherein state of polarization of each component of the incident light separated by said second polarizing separating film is controlled by said polarization controller, and optical path of each component whose state of polarization has been controlled is switched by said first polarizing separating film.

5. The optical switch according to claim 4, wherein thickness of said optical transmission member is made uniform, a plurality of said first polarizing separating films are provided, length of each first polarizing separating film and deposited position thereof are decided in conformity with a network configuration of the optical switch, and optical paths of a plurality of incident light beams are controlled.

6. The optical switch according to claim 5, wherein a plurality of optical switches conforming to various network configurations are formed so as to be optically coupled and integrated.

7. The optical switch according to claim 2, wherein a plurality of said first polarizing separating films are provided, thickness of said optical transmission member, number of said first polarizing separating films deposited, length of each first polarizing separating film and deposited position thereof are decided in conformity with a network configuration of the optical switch, and optical paths of a plurality of incident light beams are controlled.

8. The optical switch according to claim 7, wherein a plurality of optical switches conforming to various network configurations are provided and formed so as to be optically coupled and integrated.

9. The optical switch according to claim 1, wherein the reflecting means provided on said optical transmission member is so adapted as to produce total internal reflection by a difference between refractive indices of said optical transmission member and air.

10. The optical switch according to claim 1, further comprising means provided on an optical input portion and an optical output portion for changing direction in which light advances.

11. The optical switch according to claim 1, further comprising condensing means for inhibiting spread of light in space.

12. The optical switch according to claim 1, wherein two of the optical switches are provided and arranged to perpendicularly intersect each other in such a manner that an optical output portion of one optical switch and an optical input portion of the other optical switch overlap, an optical path of a light signal incident upon the optical input portion of the one optical switch in two dimensions is switched in two dimensions by the two optical switches and outputted from the optical output portion of the other optical switch.

13. An optical switch for switching optical path of incident light, comprising:

an optical distributor for distributing each of n-number of incident light beams to first through n-th optical paths and shifting the distributing optical path of each incident light beam in direction of propagation at a prescribed pitch with respect to the distributing optical path of a neighboring incident light beam;

an i-th optical shutter, which is provided to correspond to an i-th distributing optical path of all incident light beams, for passing light from the i-th distributing optical path conforming to a j-th incident light beam and blocking other light beams; and condensing means for condensing light which passes through said i-th optical shutter and outputting the condensed light on an i-th output optical path;

said optical distributor including:

a stacked optical transmission member comprising a plurality of stacked parallel plate-shaped optical transmission members;

first and second reflecting means provided on both sides of said stacked optical transmission member in such a manner that incident light propagates owing to reflection; and a partial reflecting film provided on each stacking surface of said optical transmission members;

wherein each incident light beam is distributed to n-number of optical paths by the partial reflecting film and the distributing optical path of each incident light beam is shifted in direction of propagation a prescribed amount with respect to the distributing optical path of a neighboring incident light beam.

14. The optical switch according to claim 13, wherein said optical distributor includes means provided on an optical input portion to which each incident light beam is input for changing the direction in which said incident light beam advances, and means provided on an optical output portion from which the distributed light beam is output for changing the direction in which said distributed light beam advances.

15. The optical switch according to claim 13, wherein said optical distributor further includes condensing means which is placed in the optical paths of the light beam for inhibiting spread of the light in space.

16. An optical switch for switching optical path of incident light, comprising:

an optical distributor for distributing each of n-number of incident light beams to first through n-th optical paths and shifting the distributing optical path of each incident light beam in direction perpendicular to the direction of propagation at a prescribed pitch with respect to the distributing optical path of a neighboring incident light beam;

an i-th optical shutter, which is provided to correspond to an i-th distributing optical path of all incident light beams, for passing light from the i-th distributing optical path conforming to a j-th incident light beam and blocking other light beams; and condensing means for condensing light which passes through said i-th optical shutter and outputting the condensed light on an i-th output optical path;

said optical distributor including:
- a stacked optical transmission member comprising a plurality of stacked parallel plate-shaped optical transmission members;
- first and second reflecting means provided on both sides of said stacked optical transmission member in such a manner that incident light propagates owing to reflection; and
- a partial reflecting film provided on each stacking surface of said optical transmission members;

wherein each incident light beam is inputted upon being shifted by a prescribed pitch in the direction perpendicular to the direction of propagation, each incident light beam is distributed to n-number of optical paths by the partial reflecting film and the distributing optical path of each incident light beam is shifted in the direction perpendicular to the direction of propagation by a prescribed pitch with respect to the distributing optical path of a neighboring incident light beam.

17. The optical switch according to claim 16, wherein said optical distributor includes means provided on an optical input portion to which each incident light beam is input for changing the direction in which said incident light beam advances and means provided on an optical output portion from which the distributed light beam is output for changing direction in which said distributed light beam advances.

18. The optical switch according to claim 16, wherein said optical distributor further includes condensing means which is placed in the optical paths of the light beam for inhibiting spread of the light in space.

19. An optical switch of transmission-type for switching an optical path of incident light, comprising:

a polarizing prism which includes:
- a stacked optical transmission member comprising stacked parallel plate-shaped optical transmission members;
- first and second reflecting means provided on both sides of said stacked optical transmission member in such a manner that incident light propagates owing to reflection; and
- a plurality of polarizing separating films each of which is provided at a position at which two prescribed incident light beams intersect owing to reflection;
- the number of polarizing separating films, length of each polarizing separating film and deposited position thereof being decided in conformity with network configuration; and a polarization controller provided in front of said polarizing prism for controlling state of polarization of incident light;

wherein state of polarization of each incident light beam is controlled by said polarization controller before the light beam arrives at said polarizing separating film, thereby controlling the optical path of each incident light beam.

20. The optical switch according to claim 19, wherein a plurality of transmission-type optical switches conforming to various network configurations are provided and optical path of incident light is controlled by optically cascade-connecting said plural transmission-type optical switches.

21. The optical switch according to claim 20, wherein two transmission-type optical switches constituting a first stage and a second stage are provided and the optical switch of the second stage is arranged at an offset of 90° with respect to the optical switch of the first stage, whereby an optical path of a light signal incident upon an optical input portion of the optical switch of the first stage in two dimensions is switched in two dimensions and outputted from the optical switch of the second stage.

* * * * *